United States Patent
Kothiwale et al.

(10) Patent No.: US 12,389,269 B2
(45) Date of Patent: Aug. 12, 2025

(54) METHOD AND APPARATUS FOR CLUSTERING IP PACKETS IN WIRELESS NETWORK

(71) Applicant: Samsung Electronics Co., Ltd., Suwon-si (KR)

(72) Inventors: Mahantesh Kothiwale, Bangalore (IN); Aneesh Narendra Deshmukh, Bangalore (IN); Nayan Ostwal, Bangalore (IN); Anshuman Nigam, Bangalore (IN); Nitin Anand, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 18/319,121

(22) Filed: May 17, 2023

(65) Prior Publication Data
US 2024/0049051 A1 Feb. 8, 2024

(30) Foreign Application Priority Data

Aug. 5, 2022 (IN) .............................. 202241044898
Mar. 8, 2023 (IN) ............................ 2022 41044898

(51) Int. Cl.
*H04L 5/00* (2006.01)
*H04L 47/36* (2022.01)
*H04W 28/06* (2009.01)

(52) U.S. Cl.
CPC ............. *H04W 28/06* (2013.01); *H04L 47/36* (2013.01)

(58) Field of Classification Search
CPC . H04W 28/06; H04W 72/12; H04W 72/1231; H04L 47/36; H04L 5/00; H04L 5/0092
USPC ......................................................... 709/238
See application file for complete search history.

(56) References Cited

U.S. PATENT DOCUMENTS

| | | | |
|---|---|---|---|
| 10,616,063 B1 * | 4/2020 | Dutta | H04L 45/50 |
| 2015/0092704 A1 * | 4/2015 | Chen | H04W 72/542 370/329 |
| 2018/0097918 A1 | 4/2018 | Nuggehalli et al. | |
| 2020/0100141 A1 | 3/2020 | Wu | |
| 2020/0120020 A1 * | 4/2020 | Dutta | H04L 45/04 |
| 2021/0058818 A1 | 2/2021 | Zhang et al. | |

FOREIGN PATENT DOCUMENTS

WO 2018/171328 A1 9/2018

\* cited by examiner

*Primary Examiner* — Jude Jean Gilles
(74) *Attorney, Agent, or Firm* — Jefferson IP Law, LLP

(57) ABSTRACT

A method and an apparatus for clustering Internet protocol (IP) packets in a wireless network are provided. The method includes receiving, by a network device in the wireless network, a plurality of IP packets from an upper layer of a user equipment (UE) in the wireless network or vice versa, initiating a timer on receiving the plurality of IP packets from the upper layer, forming a cluster of IP packets having a predetermined maximum size while the timer is running, stopping the timer once the formation of the cluster is completed, and transmitting the cluster of IP packets to a lower layer of the UE, where the lower layer treats the cluster of IP packets as a single payload to minimize the IP packets handled at the lower layer of the UE.

20 Claims, 17 Drawing Sheets

METHOD AND APPARATUS FOR CLUSTERING IP PACKETS IN WIRELESS NETWORK

CROSS-REFERENCE TO RELATED APPLICATION(S)

This application is based on and claims priority under 35 U.S.C. § 119(a) of an Indian Provisional patent application number 202241044898, filed on Aug. 5, 2022, in the Indian Patent Office, and of an Indian Complete patent application number 202241044898, filed on Mar. 8, 2023, in the Indian Patent Office, the disclosure of each of which is incorporated by reference herein in its entirety.

BACKGROUND

1. Field

The disclosure relates to wireless communication. More particularly, the disclosure relates to a method and an apparatus for clustering Internet protocol (IP) packets to minimize a number of IP packets handled in a wireless network.

2. Description of Related Art

FIG. 1 illustrates a fourth-generation (4G) header processing system according to the related art.

Referring to FIG. 1, in fourth-generation/long-term evolution (4G/LTE) system, packets received from a packet data convergence protocol (PDCP) layer are concatenated at a radio link control (RLC) layer as shown in FIG. 1. For concatenation, RLC sequence number (SN) is assigned to a RLC protocol data unit (PDU) only after receiving a grant. The grant is a transmission opportunity provided by a network to a user equipment (UE) in a form of number of bytes to be transferred. Further, each RLC PDU consists of a variable number of RLC service data units (SDUs), where 1 RLC SDU=1 PDCP PDU. Each PDCP PDU has 1 PDCP SN. However, RLC pre-processing is not possible for 4G as a number of RLC SDUs to be packed is dependent on the grant size. In addition, due to variable number of PDCP packets in the RLC PDU, a RLC Header is variable in size. Therefore, the number of RLC SN required is less with low throughput requirement and concatenation at the RLC layer. The RLC SN range in 4G is just a 10-bit number 1024.

FIG. 2 illustrates a fifth-generation (5G) header processing system, according to the related art.

Referring to FIG. 2, in fifth-generation/new radio (5G/NR) system, to allow pre-processing and to introduce a fixed size RLC header, the RLC SN is allocated to every RLC SDU as shown in FIG. 2. In the 5G/NR system, one Internet protocol (IP)packet and one PDCP PDU are defined as shown below.
  1 IP Packet=1 PDCP SDU=1 PDCP SN→1 PDCP PDU
  1 PDCP PDU=1 RLC SDU=1 RLC SN Moreover in the 5G/NR system, real time processing is limited to only segmentation at the RLC layer when a complete RLC SDU cannot be packed in a medium access control transport block (MAC TB).

Comparatively, the concatenation at the LTE system is simplified only at the RLC layer and there is no gain in the PDCP layer. Whereas in the NR system, the concatenation at the MAC layer occurs after receiving the grants, leading to segmentations of the RLC PDUs. In addition, when concatenation is performed at the RLC layer, the size of concatenated packets is dependent on the grant. However, when concatenation is performed at above layers, a major drawback is related to the grant size, which may result in heavy segmentation of the packets.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for clustering Internet protocol (IP) packets to minimize a number of IP packets handled in a wireless network. The proposed method is implemented in a network device and a user equipment (UE). The method includes receiving a plurality of IP packets from an upper layer of the UE or a radio access network (RAN) base station (NB) by the network device or vice versa. The UE includes but not limited to a service data adaption protocol (SDAP) layer, a packet data convergence protocol (PDCP) layer, a radio link control (RLC) layer, a medium access control (MAC) layer, and a physical (PHY) layer.

Another aspect of the disclosure is to establish a packet blender layer above/below the upper layer of the UE or the NB, and aggregate the IP packets corresponding to same radio bearer (RB) into a cluster of IP packets at the packet blender layer by setting a ClusterSize, a ClusterCount and an AccumulateTime.

Another aspect of the disclosure is to drastically minimize the number of IP packets to be handled at a lower layer of the UE or the NB to a single payload upon receiving the cluster of IP packets from the packet blender layer. Thereby, reducing the data plane processing load in beyond fifth-generation (5G) and sixth-generation (6G) based devices.

Therefore, the packet blender layer of the proposed disclosure helps in adapting the packet size variation if required to be done as per channel variations and a grant size. In addition, a location of the packet blender layer is selected flexibly by the network device based on suitability of operation and the requirement of an application.

Additional aspects will be set forth in part in the description which follows and, in part, will be apparent from the description, or may be learned by practice of the presented embodiments.

In accordance with an aspect of the disclosure, a method for clustering Internet protocol (IP) packets by a network device in a wireless network is provided. The method includes receiving a plurality of IP packets from an upper layer of a user equipment (UE) or base station (BS) or radio access network (RAN) base station (NB) in the wireless network, in response to transmitting a grant by the network device to one of the UE and the NB, initiating a timer on receiving the plurality of IP packets from the upper layer, forming a cluster of IP packets having a predetermined maximum size while the timer is running, stopping the timer once the formation of the cluster is completed, and transmitting the cluster of IP packets to a lower layer of the UE or NB, wherein the lower layer treats the cluster of IP packets as a single payload.

In an embodiment, initiating, by the network device, the timer on receiving the plurality of IP packets from the upper layer includes detecting the plurality of IP packets received by the upper layer of the UE or the NB, and forming a packet blender layer in the UE or the NB based on a plurality of parameters, where the packet blender layer receives the plurality of IP packets from the upper layer. The method includes accumulating the plurality of IP packets in the packet blender layer, and starting the timer to form the cluster of IP packets in the packet blender layer by setting a ClusterSize and a ClusterCount.

In an embodiment, the ClusterSize is a maximum accumulated size of the cluster of IP packets, and the ClusterCount is a maximum accumulated number of the IP packets formed within the cluster of IP packets.

In an embodiment, the plurality of parameters includes at least one of requirement of an application, a service level agreement between an application provider and a service provider, a pre-configured message exchange between the application provider and the service provider, and a pre-defined network slice identifier.

In an embodiment, the pre-defined network slice identifier decides location of the packet blender layer at one of the UE, the NB, the network device above a serving gateway (SGW)/packet data network gateway (PGW), any layer between the RAN and the application layer, and the application layer.

In an embodiment, forming, by the network device, the cluster of IP packets having the predetermined maximum size while the timer is running includes determining radio bearers (RBs) through which each IP packet of the plurality of IP packets are received, detecting at least two IP packets of the plurality of IP packets belonging to the same RB, and forming the cluster of IP packets having the at least two IP packets of the plurality of IP packets belonging to the same RB such that the lower layer treats the cluster of IP packets as the single payload.

In an embodiment, transmitting the grant, by the network device, to one of the UE or the NB includes determining a fixed size packet from the plurality of IP packets, where the fixed size packet is configured as per a FixedPacketSize configuration, forming a radio link control (RLC) protocol data unit (PDU) based on the fixed size packet, and forming a medium access control (MAC) transport block (TB) by processing the fixed size packet based on the FixedPacketSize configuration to transmit the grant to one of the UE or the NB.

In an embodiment, the grant is processed in terms of number of packets based on the FixedPacketSize configuration.

In an embodiment, one of the UE and the NB receives the grant from the network device and optimizes maximum segment size at a transmission control protocol (TCP) layer to transmit the plurality of IP packets to the network device.

In accordance with an aspect of the disclosure, a method for clustering the IP packets by a UE in the wireless network is provided. The method includes receiving the plurality of IP packets from the upper layer of the network device or the BS or the RAN NB in the wireless network, in response to transmitting a grant by the UE to one of the network device and the NB, initiating a timer on receiving the plurality of IP packets from the upper layer, forming a cluster of IP packets having a predetermined maximum size while the timer is running, stopping the timer once the formation of the cluster is completed, and transmitting the cluster of IP packets to a lower layer of the network device or NB, wherein the lower layer treats the cluster of IP packets as a single payload.

In accordance with an aspect of the disclosure, a network device for clustering the IP packets in the wireless network is provided. The method includes a memory, a communicator and at least one processor coupled to the memory and the communicator. The at least one processor is configured to receive a plurality of IP packets from an upper layer of one of a user equipment (UE) and a radio access network (RAN) base station (NB) in the wireless network, in response to transmitting a grant by the network device to one of the UE and the NB, initiate a timer on receiving the plurality of IP packets from the upper layer, form a cluster of IP packets having a predetermined maximum size while the timer is running, stop the timer once a formation of the cluster is completed, and transmit the cluster of IP packets to a lower layer of one of the UE and the NB, wherein the lower layer treats the cluster of IP packets as a single payload.

In accordance with an aspect of the disclosure, a system for clustering the IP packets to minimize the number of IP packets handled in the wireless network is provided. The system includes a network device, a UE, and a radio access network (RAN) base station (NB). The network device includes a memory, a processor coupled to the memory, a communicator coupled to the memory and the processor, and an IP packet management controller coupled to the memory, the processor and the communicator. The IP packet management controller is configured to receive the plurality of IP packets from the upper layer of the UE in the wireless network, initiate the timer on receiving the plurality of IP packets from the upper layer, form the cluster of IP packets having a predetermined maximum size while the timer is running, stop the timer once the formation of the cluster is completed, and transmit the cluster of IP packets to the lower layer of the UE or the NB, wherein the lower layer treats the cluster of IP packets as a single payload to minimize the IP packets handled at the lower layer of the UE or the NB.

In accordance with an aspect of the disclosure, a system for clustering the IP packets in the wireless network is provided. The system includes a network device, a UE, and a RAN NB. The UE includes a memory, a processor coupled to the memory, a communicator coupled to the memory and the processor, and an IP packet management controller coupled to the memory, the processor and the communicator. The IP packet management controller is configured to receive the plurality of IP packets from the upper layer of the network device in the wireless network, initiate the timer on receiving the plurality of IP packets from the upper layer, form the cluster of IP packets having a predetermined maximum size while the timer is running, stop the timer once the formation of the cluster is completed, and transmit the cluster of IP packets to the lower layer of the network device or the NB, wherein the lower layer treats the cluster of IP packets as a single payload to minimize the IP packets handled at the lower layer of the network device or the NB.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
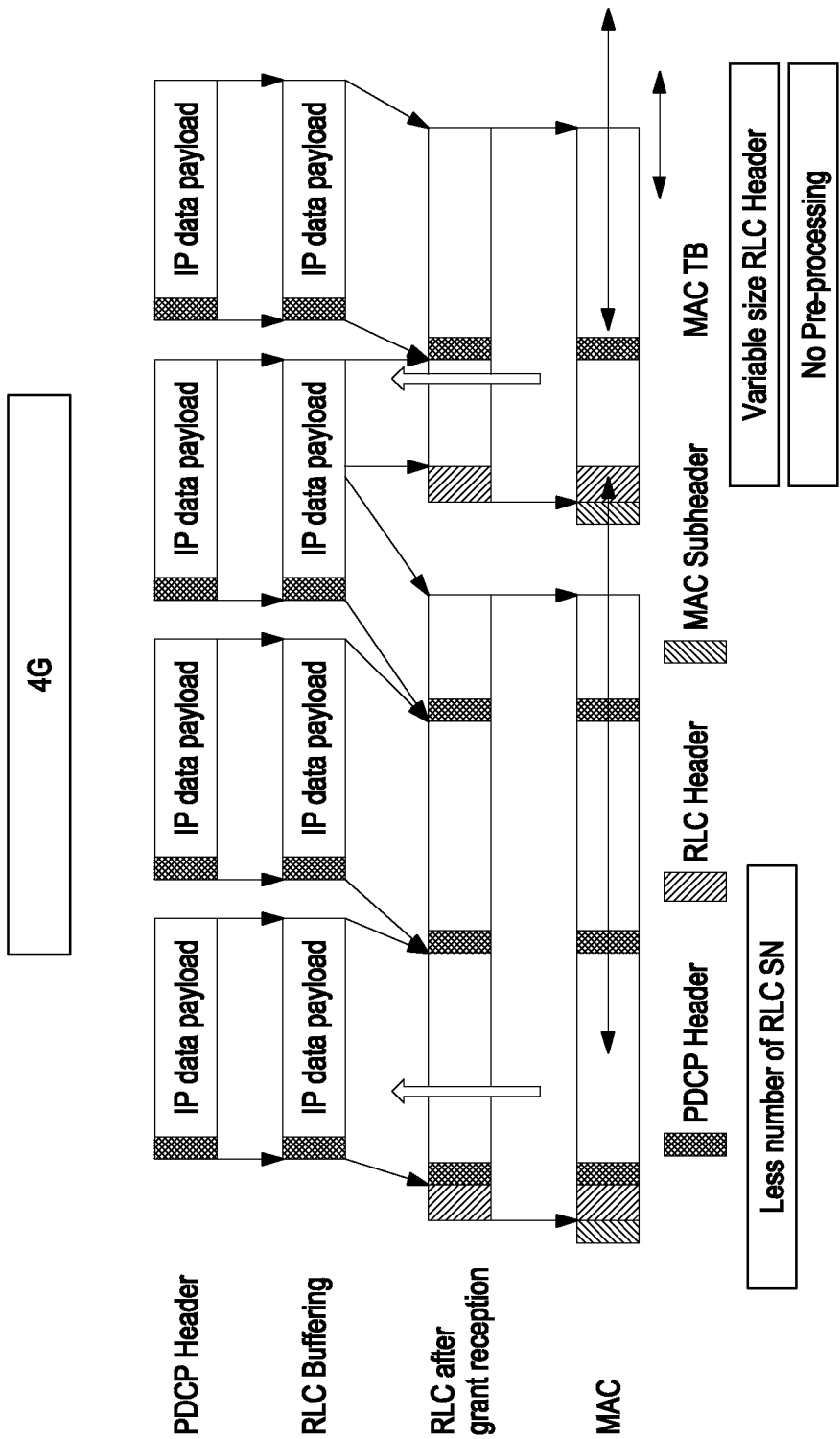
FIG. 1 illustrates a fourth-generation (4G) header processing system, according to the related art.
Figure 2:
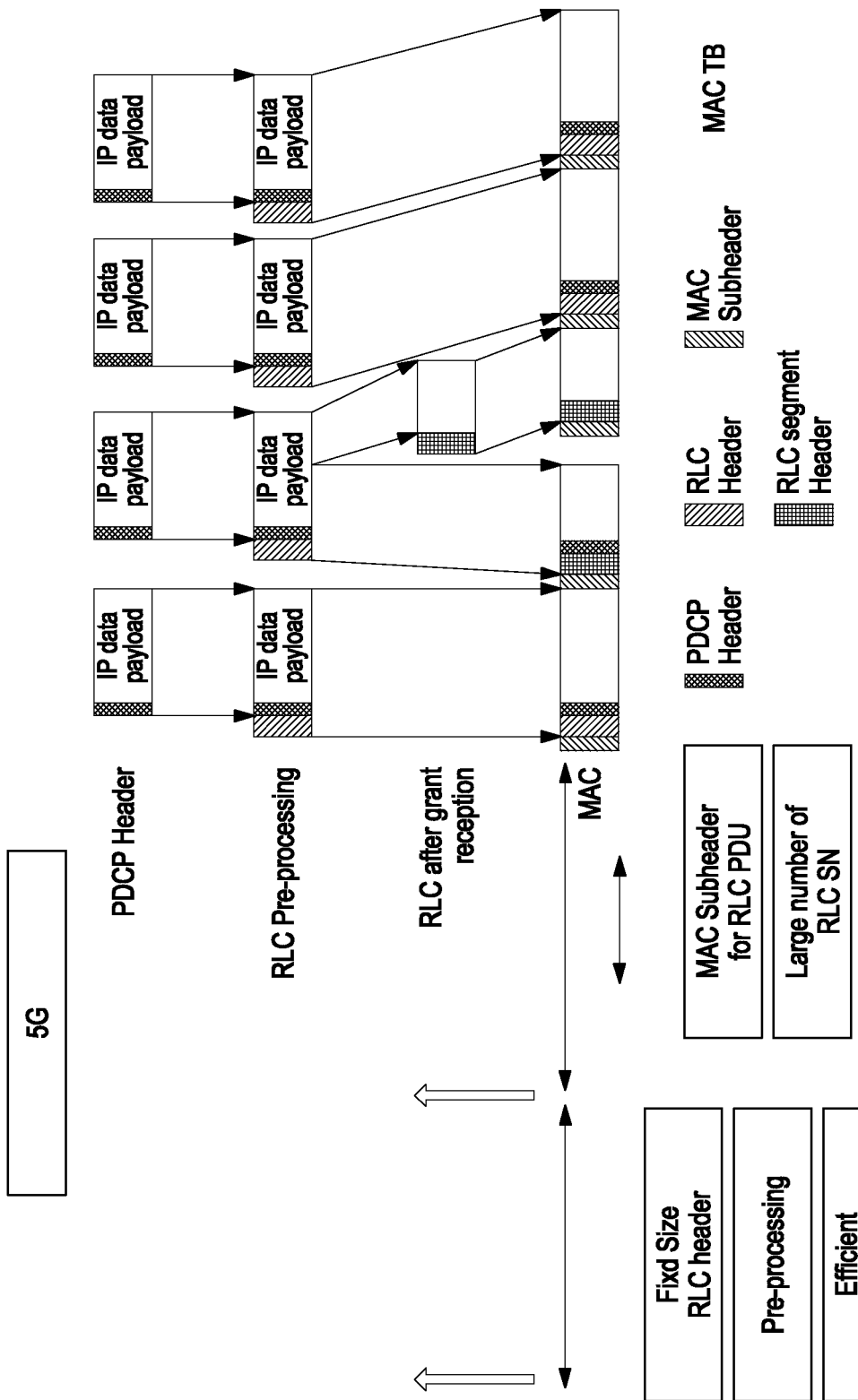
FIG. 2 illustrates a fifth-generation (5G) header processing system, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hard-wired circuits, and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly the embodiments herein disclose a method for clustering Internet protocol (IP) packets to minimize a number of IP packets handled in a wireless network. The method includes receiving, by a network device in the wireless network, a plurality of IP packets from an upper layer of a user equipment (UE) radio access network (RAN) base station (NB) in the wireless network. The method includes initiating a timer on receiving the plurality of IP packets from the upper layer. The method includes forming a cluster of IP packets having a predetermined maximum size while the timer is running. The method includes stopping the timer once the formation of the cluster is completed, and transmitting the cluster of IP packets to a lower layer of the UE or the NB, where the lower layer treats the cluster of IP packets as a single payload to minimize the IP packets handled at the lower layer of the UE or the NB.

Accordingly the embodiments herein disclose a system for clustering the IP packets to minimize the number of IP packets handled in the wireless network. The system includes the network device and the UE. The network device includes a memory, a processor coupled to the memory, a communicator coupled to the memory and the processor, and an IP packet management controller coupled to the memory, the processor and the communicator. The IP packet management controller is configured to receive the plurality of IP packets from the upper layer of the UE or the NB in the wireless network, initiate the timer on receiving the plurality of IP packets from the upper layer, form the cluster of IP packets having a predetermined maximum size while the timer is running, stop the timer once the formation of the cluster is completed, and transmit the cluster of IP packets to the lower layer of the UE or the NB. The lower layer treats the cluster of IP packets as a single payload to minimize the IP packets handled at the lower layer of the UE or the NB.

Conventional methods and systems handle the IP packets from various applications. More particularly, as per a $3^{rd}$ generation partnership project (3GPP) new radio (NR) specification, an electronic device handles the IP packets from various applications. The size of the IP packets being handled is of varying size from few 10 s of bytes to 1000 s of bytes. Maximum size of the IP packet can be up to 9k bytes due to Ethernet jumbo frame size limitation. These IP packets are then processed one by one, where 1 IP packet=1 packet data convergence protocol (PDCP) service data unit (SDU)=1 PDCP protocol data unit (PDU) with 1 PDCP sequence number (SN)=1 radio link control (RLC) SDU=1 RLC PDU with 1 RLC SN.

At a medium access control (MAC) layer, based on a grant (i.e., the size of a transport block (TB) which can be sent over a physical (PHY) layer in one transmission opportunity) received, multiple RLC PDUs in one MAC TB are sent over the PHY layer. Moreover, MAC does the concatenation of multiple the RLC PDUs, from the same or different bearers, into a single MAC TB. Due to the nature of mapping between the IP packets, the PDCP SDU, the RLC PDU, NR allows for a lot of packet header preparation to be pre-processed, implying that PDCP headers, the RLC headers and to some extent MAC sub-headers for data path can be prepared even before getting grants from lower layers. However in conventional methods and systems, the grants are received in terms of bytes and the grants are allocated for the entire UE. Thus, on reception of the grant, MAC has to decide on scheduling of the received grants to different radio bearers (RBs), and based on the grant allocated, respective RLC layer can pack its PDUs and deliver those to the MAC layer.

Further, in conventional protocol processing, the processing involved is directly proportional to the number of headers present in the packet. Protocol's memory requirement for own metadata is also directly proportional to the number of sequence numbers managed by that protocol layer. Moreover, actual data packet size does not really matter at the processing as various data packets can still be managed and merged using hardware (HW) direct memory accelerators (DMA) which can copy data from one memory location to another location. This process can be enhanced by having an enhanced DMA. The number of headers can be reduced by concatenation and is widely addressed through various schemes about concatenation at the RLC layer, concatenation at the MAC, and concatenation at the PDCP layer. However, all the concatenations are limited at the RAN and do not specify the ways of handling the concatenation at the above layers. In addition, when concatenation is performed at the RLC layer, the size of concatenated packets is dependent on the grant. When the concatenation is performed at above layers, a major drawback can be related to grant size, resulting in heavy segmentation as the concatenated packet size at the PDCP (and/or above) layer is not really aware about the grant processing.

Unlike the conventional methods and systems, the proposed method provides a generic scheme to manage and handle concatenation at any layer above the RAN, or between the RAN and user plane function (UPF), or at the UPF, or at a transport layer, or at an application layer. The proposed method includes a packet blender layer, where the placement of the packet blender layer is free to choose as per an application quality of service (QoS) requirement. The proposed method considers various parameters and configurations which can be static or dynamic in nature based on the application QoS requirement and/or RAN performance. Further, artificial intelligence (AI) based solutions are utilized in order to consider the configurations to tackle an increased throughput and processing requirement for a future application by simplifying the required packet processing at the protocol layers by forming clusters of packets to be handled together.

Referring now to the drawings and more particularly to FIGS. 3 through 17, where similar reference characters denote corresponding features consistently throughout the figure, these are shown preferred embodiments.

Figure 3:
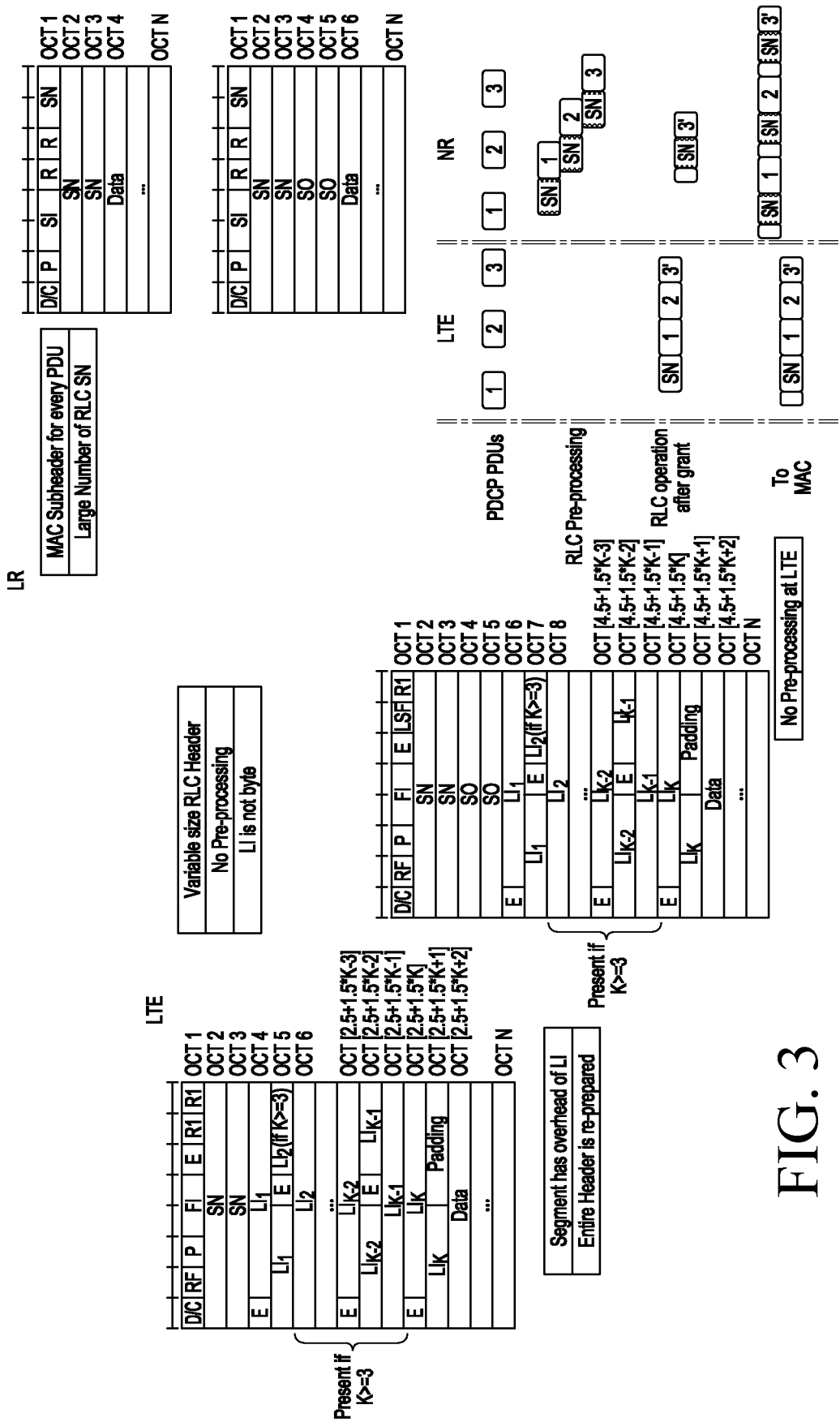
FIG. 3 is a schematic view illustrating comparison between 4G and 5G headers and packet formation in the 4G and the 5G according to the related art.

FIG. 3 is a schematic view illustrating comparison between 4G and 5G headers according to the related art.

Referring to FIG. 3, in a fourth-generation/long-term evolution (4G/LTE) system, there is no pre-processing of medium access control (MAC) sub-header as well as radio link control (RLC) headers due to concatenation at the RLC which is dealt with in real time. Due to concatenation at the RLC, the number of RLC sequence numbers (SN) required is less with low throughput requirement. Whereas in a fifth-generation/new radio (5G/NR) system, pre-processing of the MAC sub-headers and RLC headers help in faster processing of the packets, and thus the number of RLC SNs required is large as each individual RLC service data unit (SDU) gets assigned with a new RLC SN. Further, the concatenation at the LTE system is simplified only at the RLC layer in NR and there is no gain in the PDCP layer functionality. Whereas in other type of system, the concatenation at the PDCP layer occurs before receiving the grants, leading to segmentations of RLC service data units (SDUs).

Moreover in the 5G/NR system, real time processing is limited to only segmentation at the RLC layer, when a complete RLC SDU cannot be packed in a MAC transport block (TB). In the 5G/NR system, RLC segment header for a first segment is of a same size as a RLC complete header size, with just 1 bit difference and hence allows for efficient segmentation handling. However, each RLC protocol data unit (PDU) is assigned with the MAC sub-header and hence the number of headers required is larger as compared to the LTE, but pre-processing of the MAC sub-header helps in faster processing of the packet. The number of RLC SNs required is large and supports up to 18-bit SN i.e., 262144.

Figure 4:
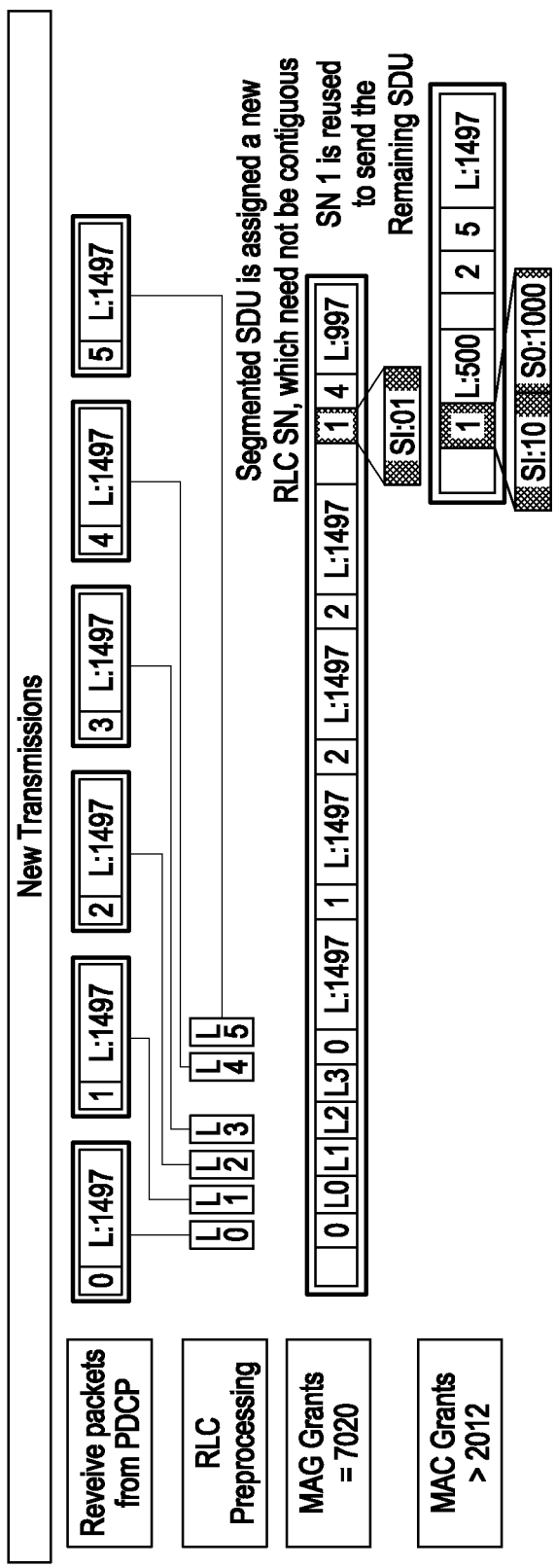
FIG. 4 illustrates a scheme for concatenation at a radio link control (RLC) layer according to the related art.

FIG. 4 illustrates concatenation at an RLC layer according to the related art.

Referring to FIG. 4, in an embodiment, concatenation of the packets at the RLC layer is illustrated. In this approach, the PDCP PDUs are concatenated at the RLC layer with each PDCP PDU having the RLC Sub-Header for a length field. When the grants are assigned, all the complete RLC SDUs are assigned with a single SN. For example, PDCP SN 0, 1, 2 and 3 has been assigned with RLC SN 0. Segmented RLC SDU i.e., PDCP SN 4 is assigned with a new RLC SN 1. Hence, the segmented RLC SDUs get assigned with the new RLC SN during the grant processing.

Figure 5:
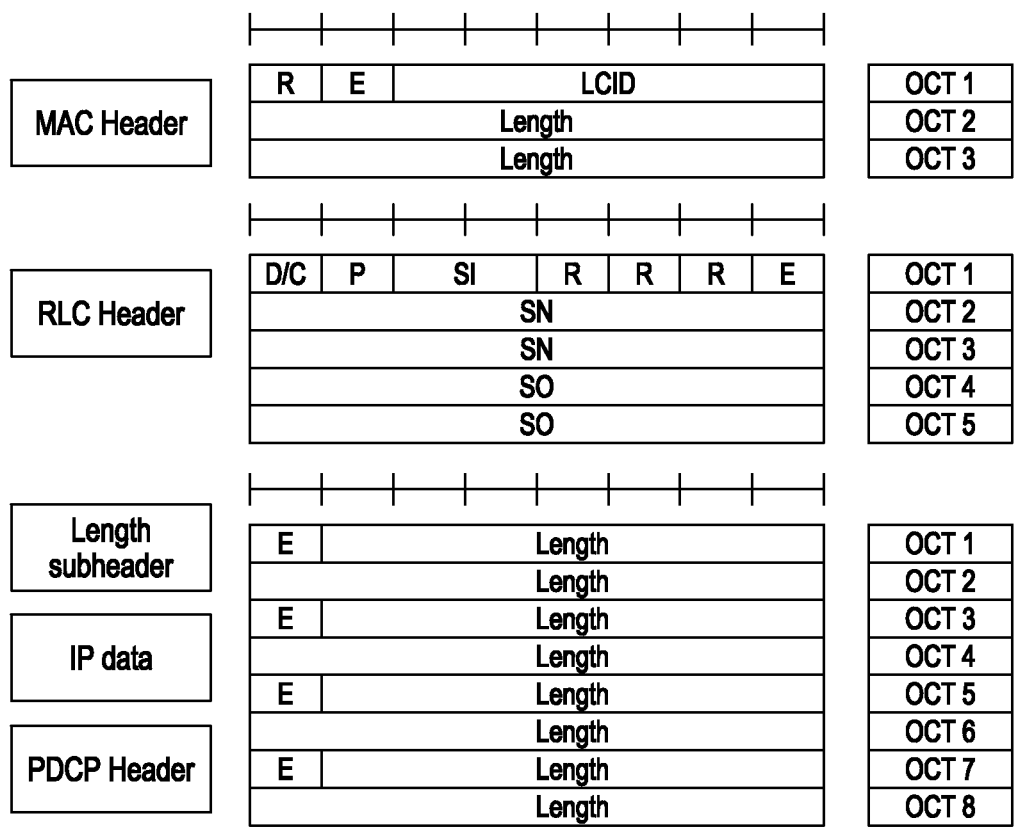
FIG. 5 illustrates a header structure for concatenation at an RLC according to the related art.

FIG. 5 illustrates concatenation at a RLC header structure according to the related art.

Referring to FIG. 5, in an embodiment, concatenation of the packets at the header structure of the RLC layer is illustrated. The length sub-header at the RLC layer of the NR is byte aligned, but the length sub-header at the RLC layer for the LTE is not byte aligned. The RLC header of the LTE is same as the RLC header of the NR.PDCP SDUs are concatenated at the PDCP layer and each PDCP SDU is assigned with a PDCP concatenation field which carries a length indicator.

Figure 6:
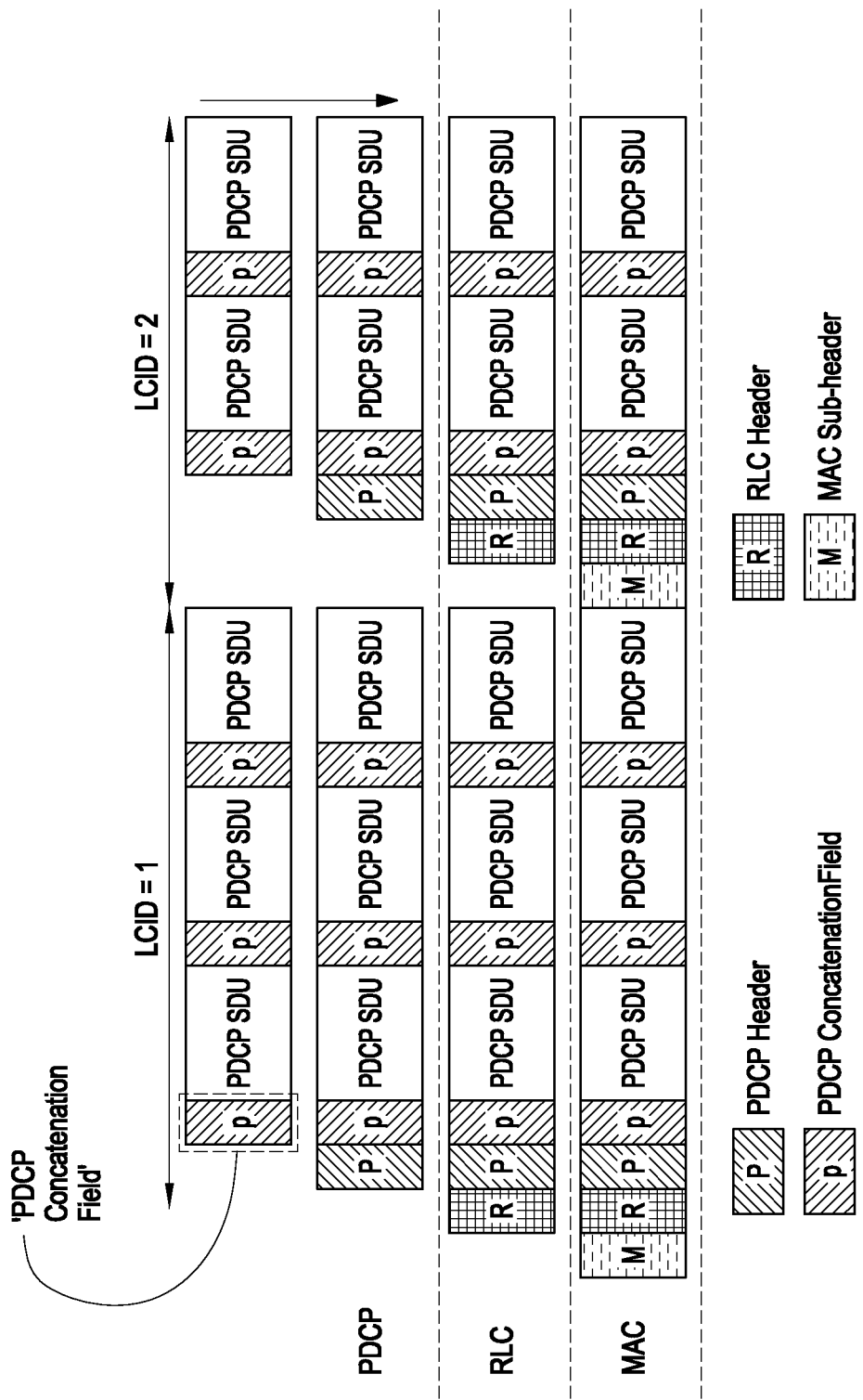
FIG. 6 illustrates a scheme for concatenation at a packet data convergence protocol (PDCP) layer according to the related art.

FIG. 6 illustrates concatenation at a packet data convergence protocol (PDCP) layer according to the related art.

Referring to FIG. 6, the PDCP SDUs are concatenated at the PDCP layer and each PDCP SDU is assigned with the PDCP concatenation field which carries the length indicator. The PDCP SDUs are assigned with the PDCP SN once the PDCP processing is done and the PDCP PDU is ready. The PDCP SDU and the PDCP PDU are defined as follows:

Multiple PDCP SDU=Multiple PDCP Concatenation Field=1 PDCP SN→1 PDCP PDU; and

1 PDCP PDU=1 RLC SDU=1 RLC SN=1 MAC Sub-Header.

Figure 7:
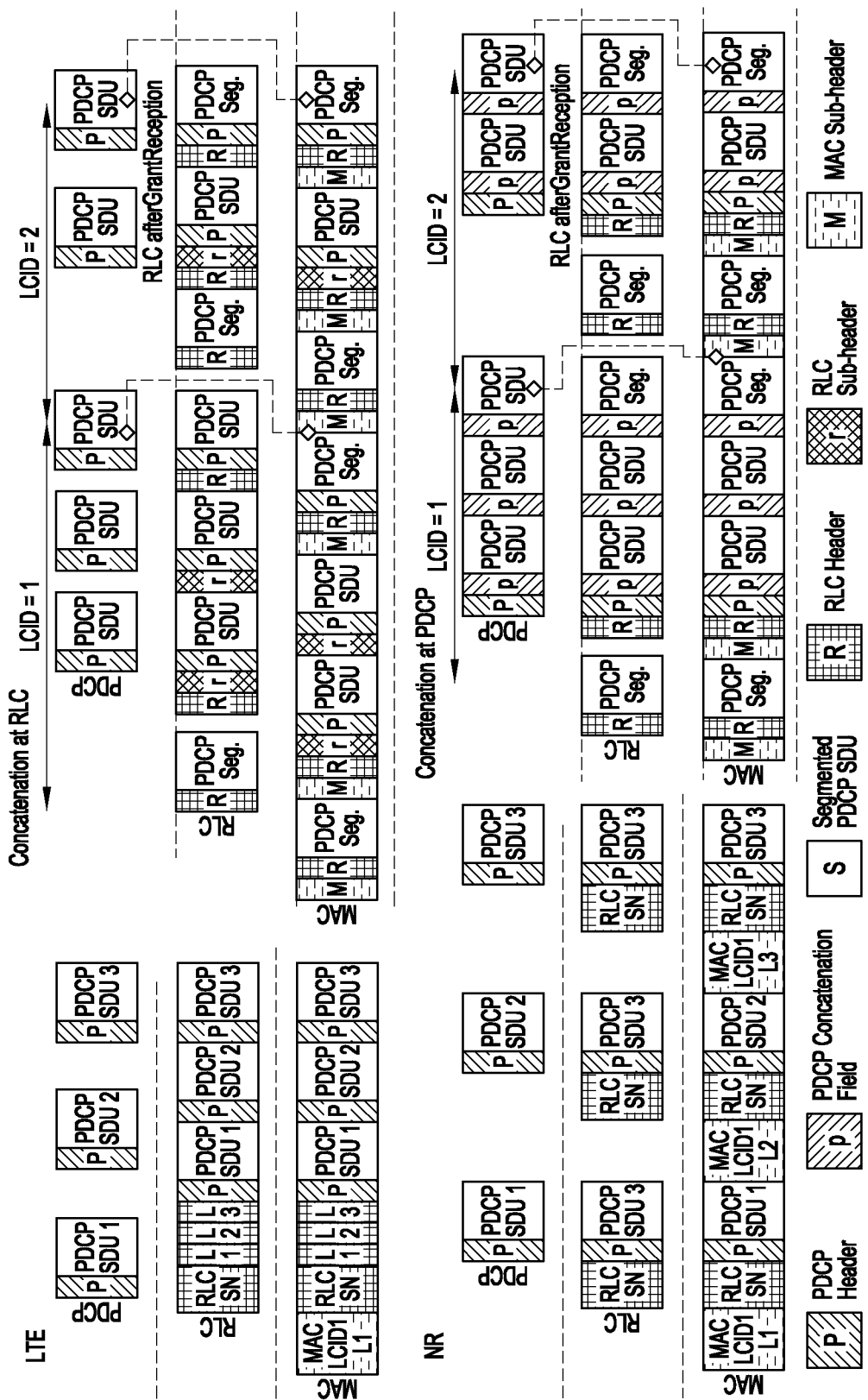
FIG. 7 illustrates a comparison between 4G and 5G systems, and a comparison between a concatenation at an RLC layer and a concatenation at PDCP layer according to the related art.

FIG. 7 illustrates a comparison between an LTE system and an NR system, and the comparison between a concatenation at an RLC layer and the concatenation at the PDCP layer according to the related art.

Referring to FIG. 7, in an embodiment, the comparison between the LTE system and the NR system, and the comparison between the concatenation at the RLC layer and the concatenation at the PDCP layer are depicted. In the LTE system, there is no pre-processing of the MAC Sub-Header, and the number of RLC SN required is less with low throughput requirement and concatenation at the RLC layer. Whereas in the NR system, pre-processing of the MAC Sub-Header helps in faster processing of the packet, and the number of RLC SNs required is large. Further, the concatenation at the LTE system is simplified only at the RLC layer and there is no gain in the PDCP layer. Whereas in the NR system, the concatenation at the PDCP layer occurs before receiving the grants, leading to segmentations of the RLC SDUs. In addition, when concatenation is performed at the RLC layer, the size of concatenated packets is dependent on the grant. However, when concatenation is performed at above layers, a major drawback is related to the grant size, which may result in heavy segmentation as concatenated packet size at the PDCP (and/or above) layer is not really aware about the grant processing.

Figure 8:
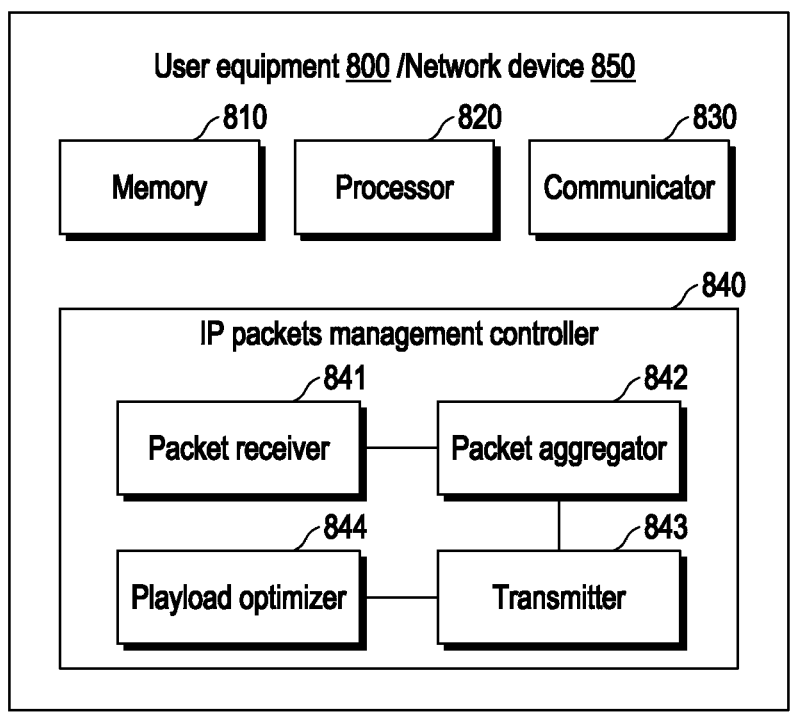
FIG. 8 is a block diagram of a user equipment (UE) and a network device of a system for minimizing data plane processing load of Internet protocol (IP) packets according to an embodiment of the disclosure.

FIG. 8 is a block diagram of a user equipment (UE) and a network device of a system for minimizing data plane processing load of a plurality of Internet protocol (IP) packets according to an embodiment of the disclosure.

Referring to FIG. 8, a UE 800 operates in combination with a network device. The proposed method can be implemented in the UE 800 and/or in the network device. The network device can be a core network. Referring to FIG. 8, the UE 800 may be but not limited to a laptop, a palmtop, a desktop, a mobile phone, a smart phone, personal digital assistant (PDA), a tablet, a wearable device, an Internet of things (IoT) device, a virtual reality device, a foldable device, a flexible device, a display device and an immersive system.

In an embodiment, the UE 800 and/or a network device 850 includes a memory 810, a processor 820, a communicator 830, and an IP packet management controller 840.

The memory 810 is configured to store configuration parameters of a plurality of Internet protocol (IP) packets. The configuration parameters include but not limited to a ClusterSize, a ClusterCount and an AccumulateTime. The memory 810 can include non-volatile storage elements. Examples of such non-volatile storage elements may include magnetic hard disks, optical disks, floppy disks, flash memories, or forms of electrically programmable read only memories (EPROMs) or electrically erasable and programmable ROM (EEPROM) memories. In addition, the memory 810 may, in some examples, be considered a non-transitory storage medium. The term "non-transitory" may indicate that the storage medium is not embodied in a carrier wave or a propagated signal. However, the term "non-transitory" should not be interpreted that the memory 810 is non-movable. In some examples, the memory 810 is configured to store larger amounts of information. In certain examples, a non-transitory storage medium may store data that can, over time, change (e.g., in random access memory (RAM) or cache).

The processor 820 may include one or a plurality of processors. The one or the plurality of processors 820 may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). The processor 820 may include multiple cores and is configured to process the configuration parameters stored in the memory 810.

In an embodiment, the communicator 830 includes an electronic circuit specific to a standard that enables wired or wireless communication. The communicator 830 is configured to communicate internally between the memory 810, the processor 820 and the IP packet management controller 840 of the UE 800 and with external devices via one or more networks.

In an embodiment, the IP packet management controller 840 includes a packet receiver 841, a packet aggregator 842, a transmitter 843 and a payload optimizer 844.

In an embodiment, the UE 800 includes but not limited to a service data adaption protocol (SDAP) layer, a packet data convergence protocol (PDCP) layer, a radio link control (RLC) layer, a medium access control (MAC) layer, and a physical (PHY) layer. The packet receiver 841 of the UE 800 is configured to receive the plurality of IP packets from the network device. The plurality of IP packets corresponds to a plurality of radio bearers (RBs).

In an embodiment, the packet aggregator 842 is configured to establish a packet blender layer above/below any layer of the UE 800 and/or the network device 850. The placement of the packet blender layer is selected based on at least one of an application quality of service (QoS) requirement, UE deployment, and a processing capability of the network device. The packet aggregator 842 is configured to aggregate at least two IP packets of the plurality of IP packets corresponding to same RB into a cluster of IP packets at the packet blender layer. The aggregation of the IP packets is based on one of the configuration parameters. The configuration parameters include but not limited to the ClusterSize, the ClusterCount and the AccumulateTime.

The ClusterSize is defined as a maximum accumulated size in bytes which is allowed to be formed when concatenating the IP packets at the packet blender layer. The ClusterSize have direct impact on how a lower layer e.g., the PDCP layer processing at segmentation being handled in case of low grants and higher accumulated size. The ClusterSize is made dynamic in order to adapt to the better processing for all the layers of the UE 800.

The ClusterCount is defined as a maximum accumulated number of packets formed within one cluster of packet at the packet blender layer. The ClusterCount directly impacts a hardware direct memory access (HW DMA) capability in order to manage/merge multiple packets into a single packet. The ClusterCount also impacts any related processing which is directly on the IP packet rather than the Headers like ciphering, integrity protection, or the like.

In an embodiment, the ClusterBytes/ClusterCount is configured based on a configuration received during a radio bearer (RB) setup during the UE setup 800 as received as a part of a radio resource configuration (RRC) connection setup. Further, the ClusterBytes/ClusterCount is re-configured based on a RB modify during UE modify. The ClusterBytes/ClusterCount can be a function of one or more of the following:

IP maximum transmission unit (MTU) data size (ClusterBytes>2×IP MTU): Different IP MTU size may enforce a different multiple to be considered for ClusterBytes i.e., N×IP MTU Size based on RB need;

Application throughput requirement: Higher the throughput requirement, bigger ClusterBytes help to pack multiple packets since inter-packet arrival rate will be low for high throughput scenario;

Quality of service (QoS) requirement of the flow: QoS imposes a requirement on latency, packet delay budget which can be independent of what kind of throughput the flow is demanding;

Maximum buffer size at Layer 1 (L1)-Layer 2 (L2) buffers: The Maximum Buffer size depends on the kind of a memory interface designed between the L1-L2. Typically in the UE 800, it will not be Ethernet but a chunk of memory is designed to handle the protocol requirements; and UE Capability: Throughput capacity, memory limitation can further restrict how much clustering a particular UE may be able to handle.

The AccumulateTime is defined as a time known for how long a particular packet can be buffered during the buffering of packet at an upper layer, so that an end to end latency of the application is not affected. In addition, certain packets can have high priority and need not be considered for buffering as it can impact the overall user experience.

In an embodiment, AccumulateTime can be a function of any of the following:

QoS Delay requirement of the flow;

Type of application data: Certain types of packets received from the application need not be buffered at the PDCP layer and forwarded immediately to the lower layers based on indication from the application.

PDCP discard timer: There are two options either that the start of PDCP discard timer is considered for the IP layer packet or can be considered exclusively at the PDCP layer without getting into account the accumulation time at the Packet Blender layer, in which case the time granularity for individual IP packet would be lost. The PDCP Discard timer value depends mainly on a Packet delay Budget of the application and applicable for each individual IP packet received at the PDCP layer. Due to clustering, since the PDCP layer is going to handle the plurality of IP packets as the single PDCP payload, differentiating a time stamp for individual IP packets is going to be trickier. If packets are clustered at the Packet Blender layer, the PDCP layer is unaware of clustering and can impose a common PDCP discard timer value for all the packets in the cluster. RB Config can impose a configuration such that AccumulationTime+PDCP Discard Time<<Packet Delay Budget of the application.

In an embodiment, the packet blender layer can be placed either at eNode B/next generation node B (eNB/gNB) or at the network device below/at a serving gateway (SGW)/user plane function (UPF) based on the application requirement, or a service level agreement between an application provider and a service provider, or based on a pre-configured message exchange between the application and the service provider, or based on the a pre-defined network slice identifier (ID) to provide such a configuration to ensure high QoS. The packet blender layer can also be per UE 800 or per data radio bearer (DRB) or per QoS flow ID, based on UE's capability or can be decided based on AI predictor learning.

The packet blender layer adds a 2 byte header to indicate a length field of each IP packet which would be required at a receiver to de-multiplex the clustered packet into individual IP packets. For simplification of processing, packet blender header exists for all the IP packets, even if 1 packet exists. Optionally, the packet blender layer can be considered as a configurable layer. The packet blender layer accumulates data until the clustered packet has reached the configured ClusterBytes/ClusterCount of the payload or until AccumulateTime has elapsed, whichever instance is first. Moreover, the PDCP layer handles the plurality of IP packets as a single PDCP service data unit (SDU), thereby reducing the need for high number of PDCP headers to be processed in one transmission time interval (TTI). The receiver packet blender layer de-multiplexes the clustered packet into individual IP packets by parsing the length field packed during packing the multiple IP packets.

In an embodiment, the transmitter 843 is configured to transfer the cluster of IP packets aggregated at the packet blender layer to the lower layer e.g., the PDCP layer.

In an embodiment, the payload optimizer 844 is configured to receive the cluster of IP packets from the packet blender layer. The payload optimizer 844 is configured to minimize the number of IP packets to be handled at the lower layer e.g., the PDCP layer to a single PDCP payload upon receiving the cluster of IP packets from the packet blender layer.

The IP packet management controller 840 is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards, and the like. The IP packet management controller 840 and the processor 820 may be integrally referred to as at least one processor.

At least one of the plurality of modules/components of the IP packet management controller 840 may be implemented through an AI model. A function associated with the AI model may be performed through memory 810 and the processor 820. The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 8 show the hardware elements of the UE 800 and/or the network device 850 but it is to be understood that other embodiments are not limited thereon. In other embodiments, the UE 800 and/or the network device 850 may include less or more number of elements. Further, the labels or names of the elements are used only for illustrative purpose and does not limit the scope of the disclosure. One or more components can be combined together to perform same or substantially similar function.

Figure 9:
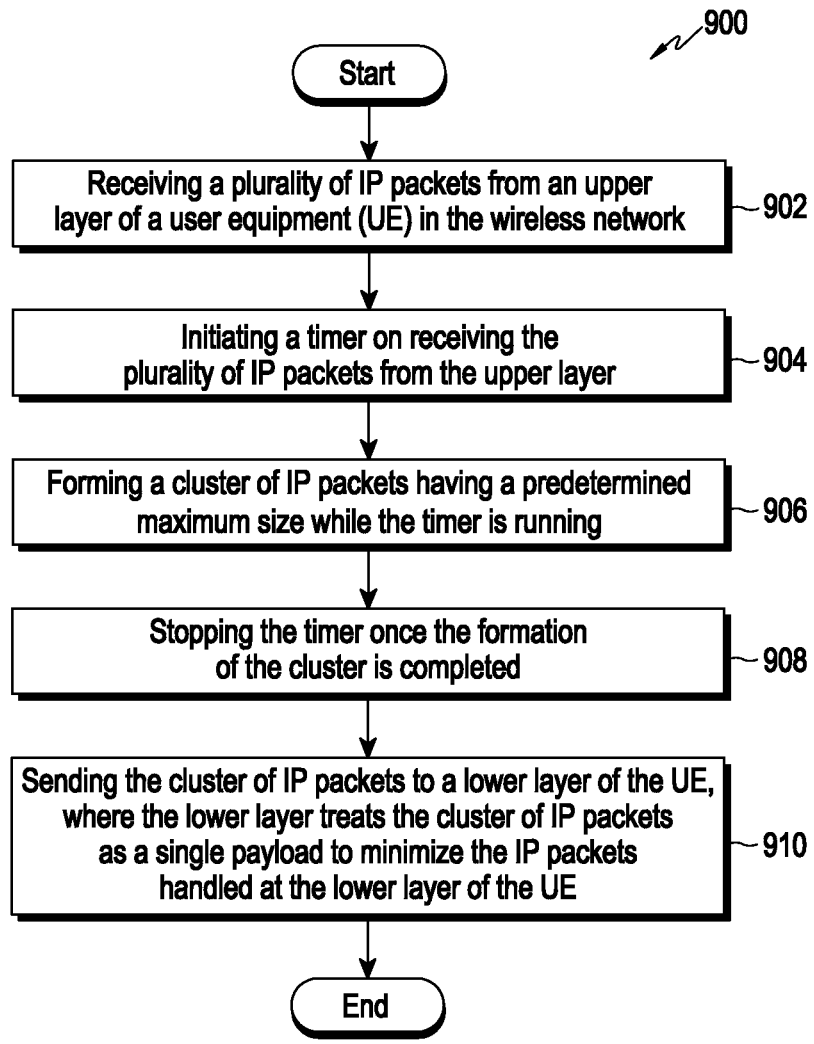
FIG. 9 is a flowchart illustrating a method for minimizing a data plane processing load of IP packets according to an embodiment of the disclosure.

FIG. 9 is a flowchart 900 illustrating a method for minimizing data plane processing load of a plurality of IP packets by a UE 800 and/or a network device 850 according to an embodiment of the disclosure.

Referring to the FIG. 9, at operation 902, the method includes receiving the plurality of IP packets from the upper layer of the UE 800 and/or the network device 850 in the wireless network. For example, in the UE 800 and/or the network device 850 as illustrated in the FIG. 8, the IP packet management controller 840 is configured to receive the plurality of IP packets from the upper layer of the UE 800 and/or the network device 850 in the wireless network.

In an embodiment, the plurality of IP packets is received from the upper layer of the UE 800 and/or the network device 850 in the wireless network after processing a grant. The grant is a transfer opportunity between the UE 800 and the network device 850, or between the network device 850 and the UE 800. The grants are processed in terms of number of packets instead of existing byte based grants. The grant is processed by (i) forming the RLC PDU based on a fixed size packet as per a FixedPacketSize configuration received during the RB setup, (ii) forming the MAC TB based on directly processing the fixed number of packets based on the FixedPacketSize, and (iii) creating chunks of the required FixedPacketSize as the single PDCP SDU in the PDCP layer or the packet blender layer. Therefore, the fixed size packet handling gives easy management of data plane packets by allowing the MAC TB to directly access the number of packets to be packet rather than checking how many packets can be packed into the MAC TB as per existing method based on total bytes of the packet.

In a variation for the above solution, if the application is configured to transmit fixed size packets such that the packet size of each and every packet getting received at a UE protocol stack is of definite size, then the grant handling can be simplified by allocating the grants to the RLC PDU in terms of the packets to be handled. Fixed size processing gives definite processing by the RLC operating directly only on the packets and doing segmentation for the last packet which cannot be sent completely in the grant allocated. No special header is required above the PDCP layer as application itself is restricting the data size and the data handling is managed efficiently.

In an embodiment, in case if the grant is not a complete multiple of number of packets, then remaining grant size is used to create the segment of the next RLC PDU in the queue. In addition, even if the grant is received in terms of bytes, the receiver MAC treats the grants in terms of number of packets and simplifies the processing further based on the FixedPacketSize units.

At operation 904, the method includes initiating the timer on receiving the plurality of IP packets from the upper layer. The UE 800 and/or the network device 850 includes but not limited to the SDAP layer, the PDCP layer, the RLC layer, the MAC layer, the PHY layer and the RF layer. The plurality of IP packets corresponds to the plurality of RB s. For example, in the UE 800 and/or the network device 850 as illustrated in the FIG. 8, the IP packet management controller 840 is configured to initiate the timer on receiving the plurality of IP packets from the upper layer.

At operation 906, the method includes forming the cluster of IP packets having the predetermined maximum size while the timer is running. For example, in the UE 800 and/or the network device 850 as illustrated in the FIG. 8, the IP packet management controller 840 is configured to form the cluster of IP packets having the predetermined maximum size while the timer is running.

At operation 908, the method includes stopping the timer once the formation of the cluster is completed. For example, in the UE 800 and/or the network device 850 as illustrated in the FIG. 8, the IP packet management controller 840 is configured to stop the timer once the formation of the cluster is completed.

At operation 910, the method includes transmitting the cluster of IP packets to the lower layer of the UE 800, where the lower layer treats the cluster of IP packets as the single payload to minimize the IP packets handled at the lower layer of the UE 800. For example, in the UE 800 and/or the network device 850 as illustrated in the FIG. 8, the IP packet management controller 840 is configured to transmit the cluster of IP packets to the lower layer of the UE 800, where the lower layer treats the cluster of IP packets as the single payload to minimize the IP packets handled at the lower layer of the UE 800.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 10:
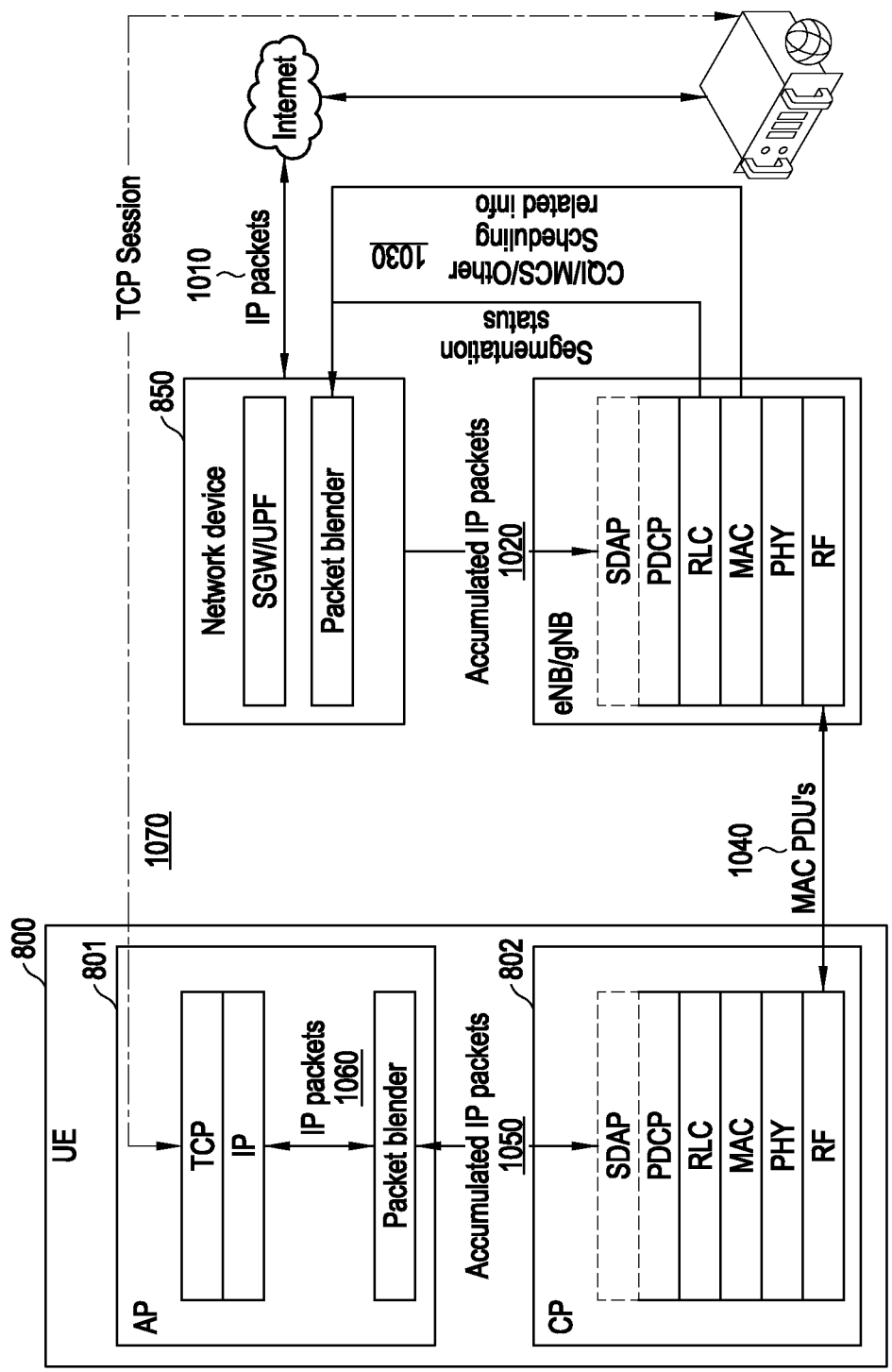
FIG. 10 is a schematic view illustrating a step-by-step procedure for minimizing a data plane processing load of IP packets according to an embodiment of the disclosure.

FIG. 10 is a schematic view illustrating a step-by-step procedure for minimizing a data plane processing load of the IP packets according to an embodiment of the disclosure.

Referring to FIG. 10, at operation 1010, the plurality of IP packets is received by the upper layer of the network device 850 from a content server during transmission of data from the UE 800 to the network device. The packet blender layer is established in the network device 850 above/below the upper layer of the network device 850. The plurality of IP packets received in the upper layer is transferred to the packet blender layer.

At operation 1020, the packet blender layer initiates the timer on receiving the IP packets from upper layer, to form the cluster having a predetermined maximum size. The plurality of IP packets corresponding to one QoS flow/ evolved packet system (EPS) bearer is accumulated into a single large SDAP/PDCP SDU.

At operation 1030, channel quality indicator (CQI)/modulation coding scheme (MCS) and other scheduling related information are input into the packet blender layer by the base station.

At operation 1040, the clustered/concatenated IP packets which form the single large SDAP/PDCP for every QoS flow/EPS bearer is output to the UE 800.

At operation 1050, the clustered/concatenated IP packets output by the network device 850 is received by a communication processor (CP) 802 of the UE 800. Further, the CP 802 of the UE 800 transmits the clustered/concatenated IP packets to an application processor (AP) 801 of the UE 800).

At operation 1060, the packet blender layer of the AP 801 receives the clustered/concatenated IP packets. The received IP packets are aggregated into a single cluster or continuous chunk of a single payload containing the plurality of IP packets as received in order.

At operation 1070, the number of SDAP/PDCP SDU is minimized by generating large size SDU's with the concatenated IP packets while keeping RLC Segmentation close to zero by establishing a TCP session between the base station and the UE 800.

Figure 11:
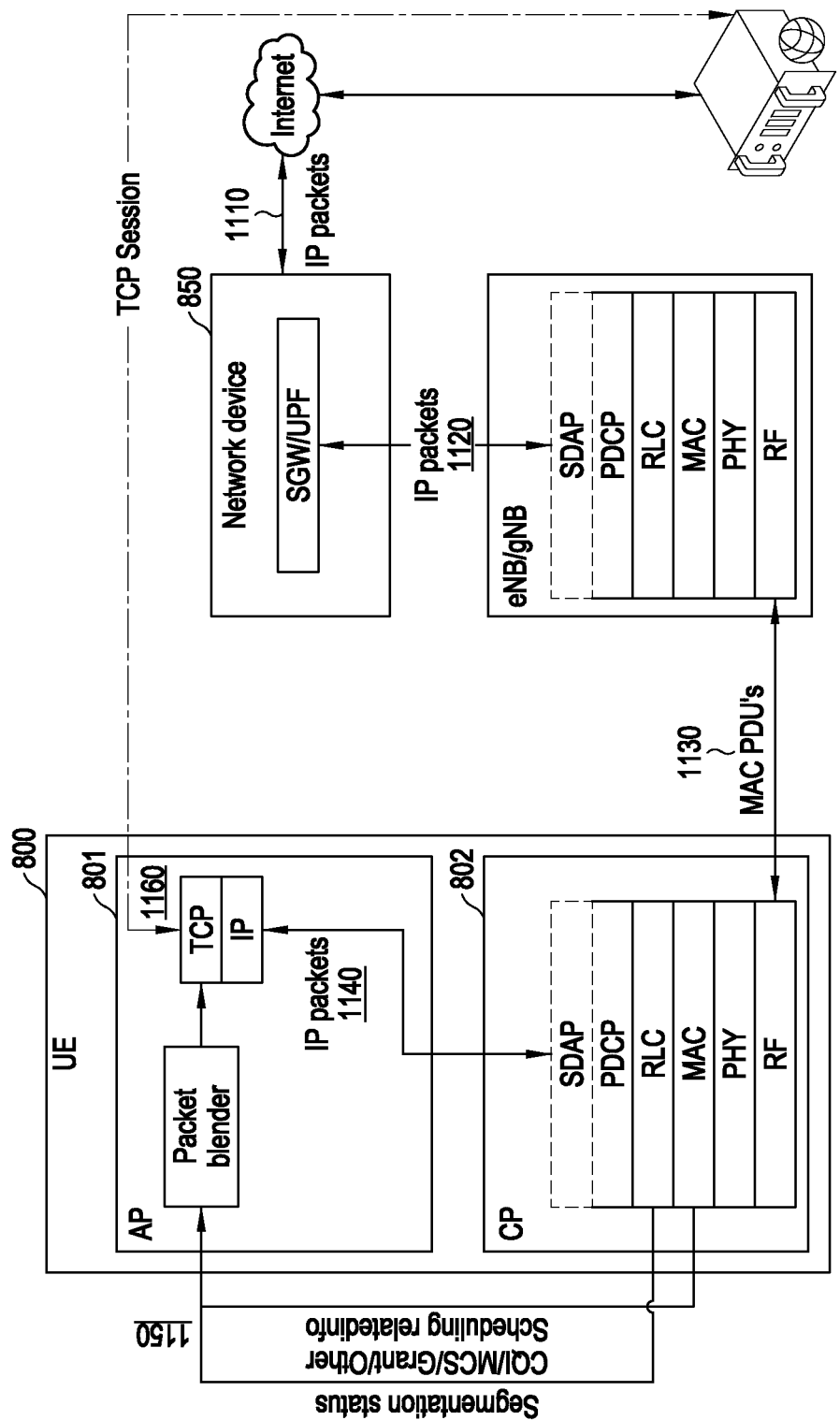
FIG. 11 is a schematic view illustrating a packet blender implication at a transport layer and/or an application layer according to an embodiment of the disclosure.

FIG. 11 is a schematic view illustrating a packet blender implication at a transport layer and/or an application layer according to an embodiment of the disclosure.

Referring to FIG. 11, at operation 1110, the plurality of IP packets is received by a serving gateway/user plane function (SGW/UPF) of the network device 850 from the content server during transmission of data from the network device to the UE 800.

At operation 1120, the plurality of IP packets received by the SGW/UPF is transferred to the upper layer of the base station.

At operation 1130, the CP 802 of the UE 800 receives the plurality of IP packets from the base station.

At operation 1140, the CP 802 of the UE 800 transfers the plurality of IP packets to the AP 801 of the UE 800. The AP 801 gets information from the TCP/IP layer for a downlink (DL) grant being received from the UE 800 in order to optimize a maximum segment size (MSS) at the TCP layer from the server. The MSS value can also be chosen by an artificial intelligence (AI) predictor model based on multiple parameters read from the CP 802 of the UE 800. The MSS value can be dynamically changed based on the nature of a channel observed and information exchanged over the TCP/IP session at appropriate intervals in order to reduce the processing for the UE 800 and a radio access network (RAN) device for example but not limited to a modem.

At operation 1150, CQI/MCS and other scheduling related information are input into the packet blender layer of the UE 800. Maximum transmission unit (MTU) negotiation is carried out based on the UE configuration parameters between the UE 800 and the content server.

At operation 1160, the TCP/IP layer at the AP 801 receives an intimation of ongoing DL grant from the UE 800. The TCP/IP layer at the AP 801 side negotiates a bigger MSS resulting into bigger MTU of the IP packets with the nearest content server based on the DL grant. With the bigger MTU size, the number of IP packets per MAC PDU in a DL direction per sub frame is reduced, thereby reducing the packet header processing load at the UE 800.

Figure 12:
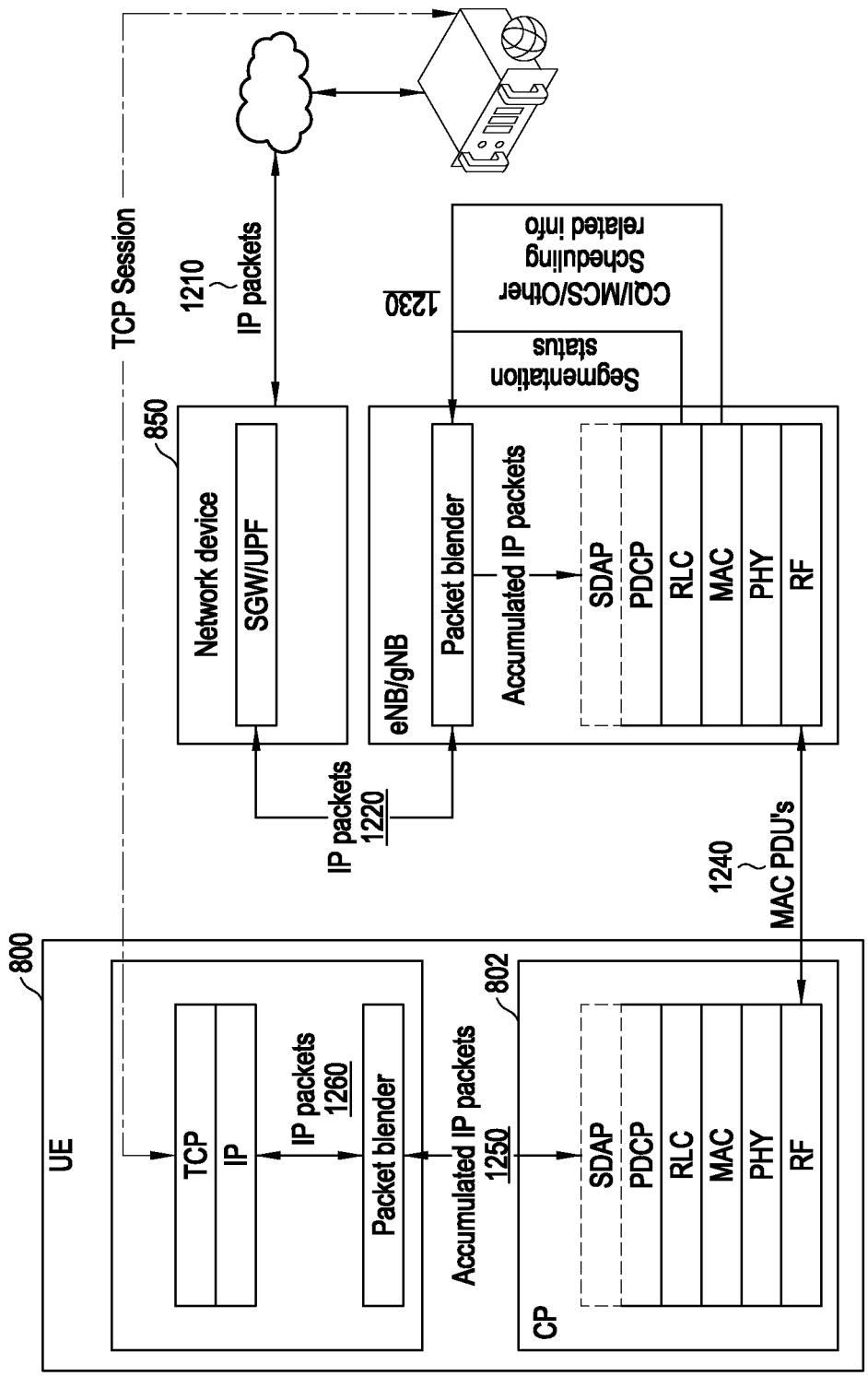
FIG. 12 is a schematic view illustrating a packet blender implication at a radio access network (RAN) above a service data adaption protocol (SDAP) layer according to an embodiment of the disclosure.

FIG. 12 is a schematic view illustrating a packet blender implication at a RAN above an SDAP layer according to an embodiment of the disclosure.

Referring to FIG. 12, at operation 1210, the plurality of IP packets is received by the SGW/UPF of the network device 850 from the content server during transmission of data from the network device to the UE 800.

At operation 1220, the base station establishes the packet blender layer. The packet blender layer receives the plurality of IP packets from the SGW/UPF of the network device 850. The packet blender layer accumulates the plurality of IP packets corresponding to one QoS flow/RB into the single large SDAP/PDCP SDU.

At operation 1230, the CQI/MCS and any other Scheduling related information are input into the packet blender layer by any one of the layers of the base station. The layers of the base station include but are not limited to the SDAP layer, the PDCP layer, the RLC layer, the MAC layer, the PHY layer and the RF layer.

At operation 1240, the plurality of IP packets accumulated in the packet blender layer is concatenated and the concatenated IP Packets which forms the single large SDAP/PDCP SDU for every QoS Flow/RB is output to the CP 802 of the UE 800.

At operation 1250, the concatenated IP Packets are transferred from the CP 802 of the UE 800 to the AP 801 of the UE 800. The AP 801 of the UE 800 includes the packet blender layer. The packet blender layer accumulates the concatenated IP Packets.

At operation 1260, since the packet blender layer accumulates the concatenated IP Packets, the number of SDAP/PDCP SDU is minimized by generating large size SDUs with the concatenated IP Packets while keeping the RLC segmentation close to zero. The number of SDAP/PDCP SDU is minimized by initiating the TCP session between the content server and the UE 800.

Figure 13:
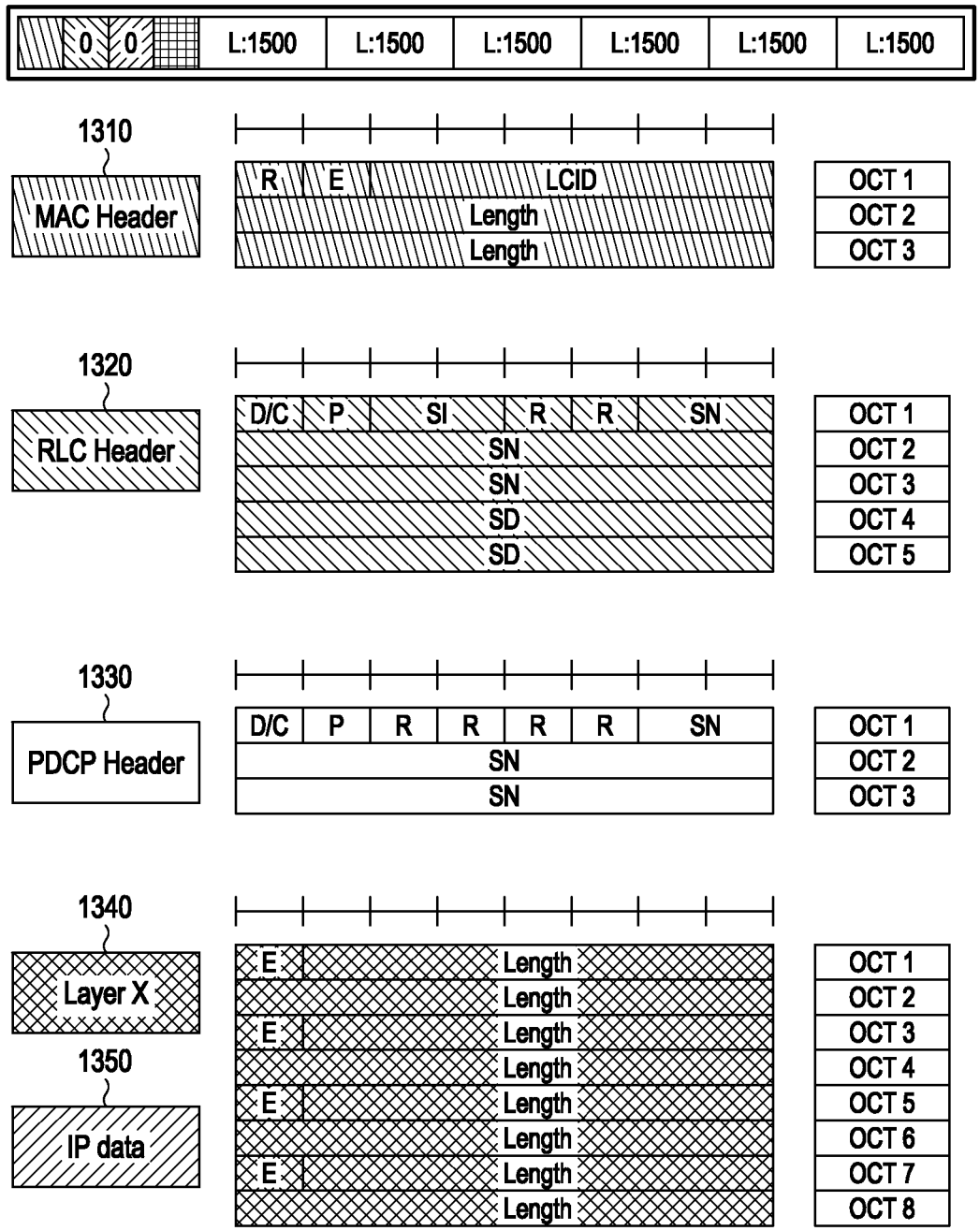
FIG. 13 illustrates a schematic view of PDCP header, RLC header, and MAC header structures for clustering IP Packets at a PDCP layer or above the PDCP layer according to an embodiment of the disclosure.

FIG. 13 illustrates a schematic view of a MAC header 1310, an RLC header 1320, and a PDCP header 1330 structures for clustering IP packets at a PDCP layer or above the PDCP layer according to an embodiment of the disclosure.

Referring to FIG. 13, the structures of the MAC header 1310, the RLC header 1320, and the PDCP header 1330 are shown. The number of IP packets/data 1350 to be handled by the PDCP layer has to be minimized. For minimizing the number of IP packets/data 1350 to be handled by the PDCP layer, a layer X 1340 which is the packet blender layer is established above or below the PDCP layer. The IP packets/data 1350 are clustered in the packet blender layer 1340, such that the IP packets/data 1350 are concatenated into the single PDCP payload just above the PDCP layer or at the PDCP layer or below the PDCP layer. Thereby, minimizing the number of IP packets/data 1350 to be handled by the PDCP layer.

Figure 14:
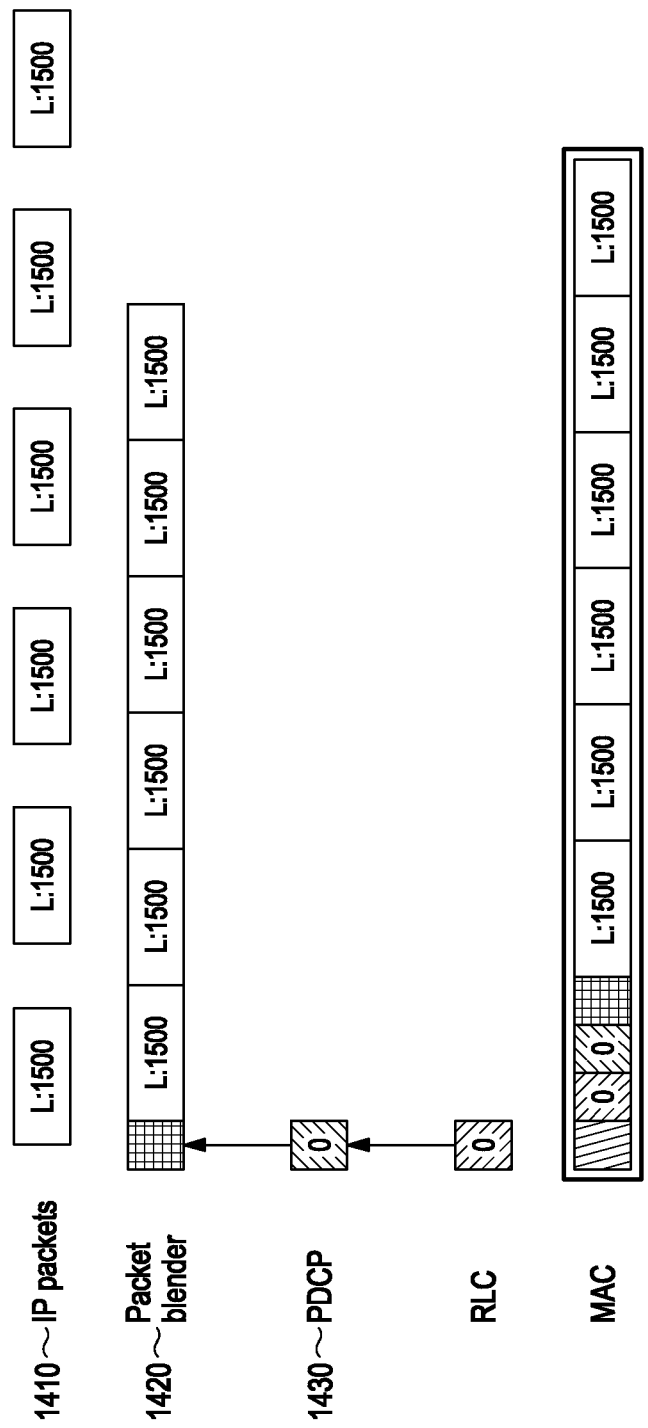
FIG. 14 illustrates a schematic view illustrating a process of packet processing for IP packets according to an embodiment of the disclosure.

FIG. 14 illustrates a schematic view illustrating a process of packet processing for IP packets 1410 according to an embodiment of the disclosure.

Referring to FIG. 14, in an embodiment, the process of packet processing for the IP packets 1410 at the PDCP layer 1430 or above the PDCP layer 1430 is illustrated in FIG. 14. The IP packets 1410 are received from the upper layer by the packet blender layer 1420. The packet blender layer 1420 aggregates the plurality of IP packets 1410 into the single cluster and prepares a new header corresponding to every packet in that cluster. The new header of the single cluster then gets assigned with a single PDCP SN, a single RLC SN and a single MAC Header if the received transmission opportunity (grant) is large enough to transfer the cluster over the size.

Figure 15:
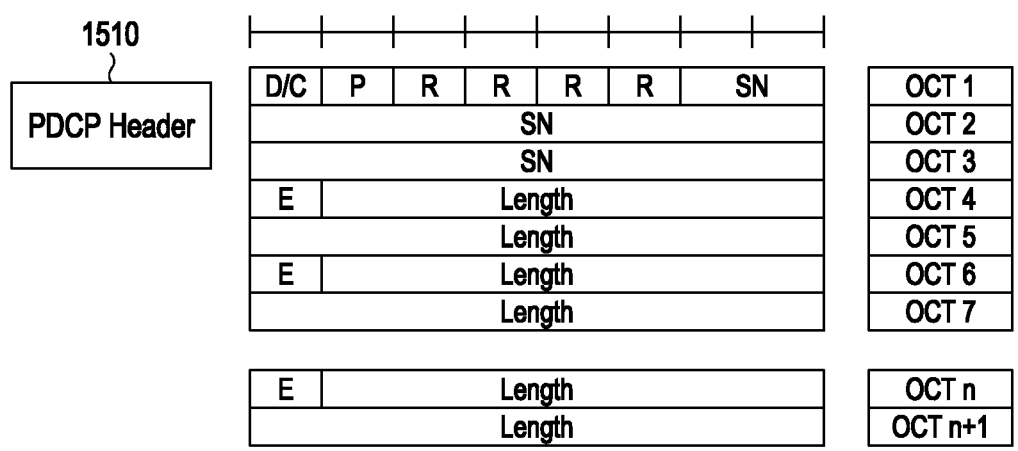
FIG. 15 illustrates an alternate header structure where a packet blender layer exists as an additional functionality within the PDCP layer according to an embodiment of the disclosure.

FIG. 15 illustrates an alternate header structure where a packet blender layer 1420 exists as an additional functionality within the PDCP layer according to an embodiment of the disclosure.

Referring to FIG. 15, in an embodiment, the new header of the single cluster assigned with the single PDCP SN, the single RLC SN and the single MAC Header is depicted as the alternate header i.e., PDCP Header 1510. The PDCP header 1510 where the packet blender layer exists as an additional layer within the PDCP layer 1420. The concatenation of the incoming IP packets (i.e., PDCP SDU) is clustered into the single PDCP PDU. Length fields for individual PDCP SDUs and indication of next IP packet is indicated in the PDCP Header 1510.

Figure 16:
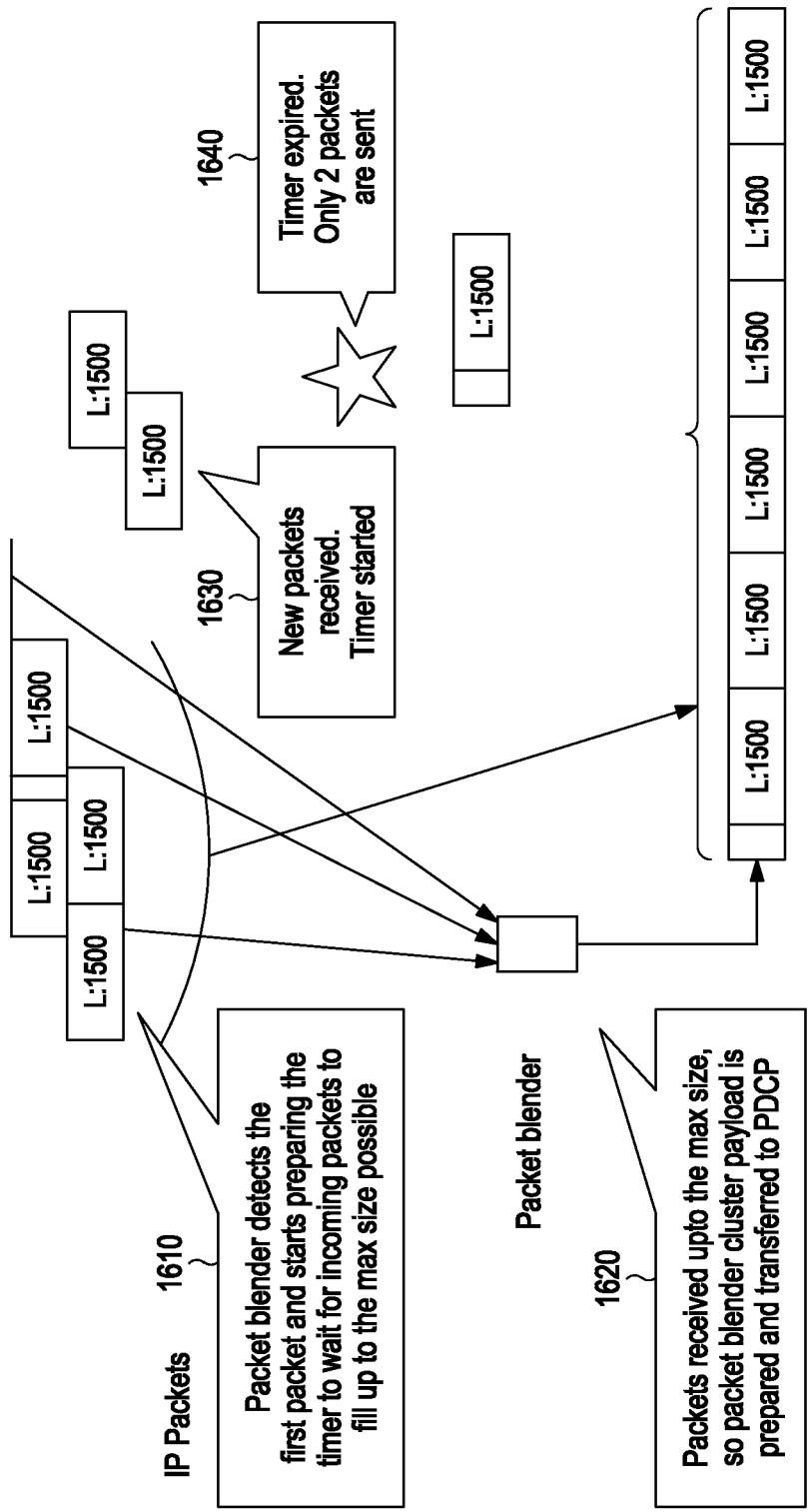
FIG. 16 is a block diagram illustrating a process for starting a timer by a packet blender layer according to an embodiment of the disclosure.

FIG. 16 is a block diagram illustrating a process for starting a timer by a packet blender layer according to an embodiment of the disclosure.

In an embodiment, AccumulateTime is applicable for the cases when the number of packets received is less than the total ClusterBytes/ClusterCount configured for the RB. AccumulateTime is a function of any of the following:
QoS Delay Requirement of the Flow of Packets Type of application data: Certain types of packets received from the application need not be buffered at the PDCP layer and forwarded immediately to the lower layers based on indication from the application.

PDCP discard timer: There are two options of using the PDCP discard timer. Either that the start of PDCP Discard Timer is considered for IP layer packet or can be considered exclusively at the PDCP layer without getting into account the accumulation time at the Packet Blender layer, where the time granularity for individual IP packet would be lost. PDCP Discard timer value depends mainly on a Packet delay Budget of the application and applicable for each individual IP packet received at the PDCP layer. Due to clustering, since the PDCP layer handles the plurality of IP packets as the single PDCP payload, differentiating time stamp for individual IP packets is going to be trickier. If packets are clustered at the Packet Blender layer, the PDCP layer is unaware of clustering and can impose a common PDCP discard timer value for all the packets in the cluster.

RB Config can impose a configuration such that
AccumulateTime+PDCP Discard Time<<Packet Delay Budget of the application.

AccumulateTime can also be predicted in a run time using the previous grants.

Referring to FIG. 16, at operation 1610, the packet blender layer detects the received packets and starts the timer to wait for the incoming packets to fill up to the maximum size possible (either ClusterBytes/ClusterCount) whichever happens first.

At operation 1620, the timer is stopped if the cluster formation of maximum size is complete.

At operation 1630, the timer is restarted on reception of new packets if the previous timer is not running.

At operation 1640, on the expiry of the timer, the cluster is formed and sent to the lower layer. The timer is called as AccumulateTime for the packet blender layer.

Figure 17:
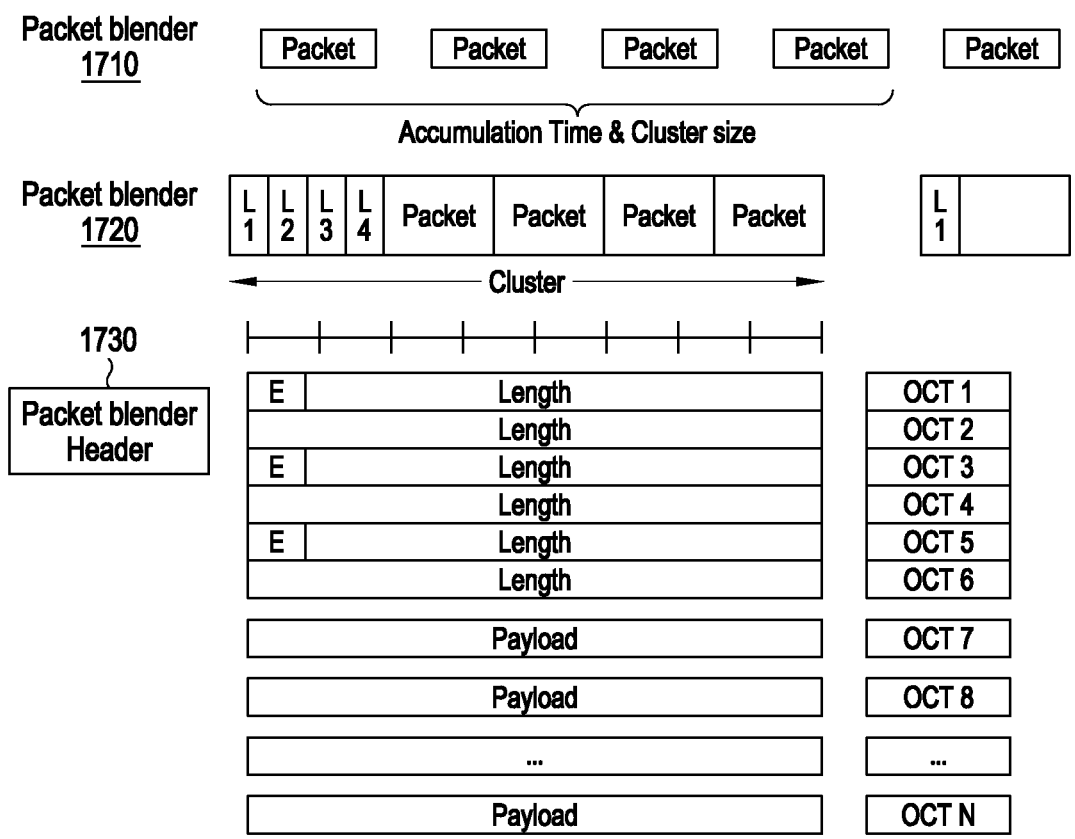
FIG. 17 is a block diagram illustrating accumulation of IP packets in a packet blender layer according to an embodiment of the disclosure.

FIG. 17 is a block diagram illustrating accumulation of IP packets in a packet blender layer according to an embodiment of the disclosure.

Referring to FIG. 17, in an embodiment, the packet blender layer 1720 is a thin layer. The packet blender layer 1720 accumulates the IP packets received from the upper layer 1710, based on the AccumulateTime or the ClusterSize. The packet blender layer 1720 appends the packet blender header 1730 on the cluster. Further, the packet blender layer 1720 parses the packet blender header 1730 and segregates the cluster payload into the packets.

The packet blender layer 1720 can adapt the packet size variation if required to be done as per the channel variations and the grant size. The packet blender layer 1720 is selected by the network device 850 based on suitability of operation and the requirement of the application.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for clustering Internet protocol (IP) packets by a network device in a wireless network, the method comprising:
   receiving a plurality of IP packets from an upper layer of one of a user equipment (UE) and a radio access network (RAN) base station (NB) in the wireless network, in response to transmitting a grant by the network device to one of the UE and the NB;
   initiating a timer on receiving the plurality of IP packets from the upper layer;
   forming a cluster of IP packets having a predetermined maximum size while the timer is running;
   stopping the timer once a formation of the cluster is completed; and
   transmitting the cluster of IP packets to a lower layer of one of the UE and the NB, wherein the lower layer treats the cluster of IP packets as a single payload.

2. The method of claim 1, wherein the initiating of the timer on receiving the plurality of IP packets from the upper layer comprises:
   detecting the plurality of IP packets received by the upper layer of one of the UE or the NB;
   forming a packet blender layer in one of the UE or the NB based on a plurality of parameters, wherein the packet blender layer receives the plurality of IP packets from the upper layer;
   accumulating the plurality of IP packets in the packet blender layer; and
   starting the timer to form the cluster of IP packets in the packet blender layer by setting a ClusterSize and a ClusterCount.

3. The method of claim 2,
   wherein the ClusterSize is a maximum accumulated size of the cluster of IP packets, and
   wherein the ClusterCount is a maximum accumulated number of the IP packets formed within the cluster of IP packets.

4. The method of claim 2, wherein the plurality of parameters comprises at least one of:
   requirement of an application;
   a service level agreement between an application provider and a service provider;
   a pre-configured message exchange between the application provider and the service provider; and
   a pre-defined network slice identifier.

5. The method of claim 4, wherein the pre-defined network slice identifier decides location of the packet blender layer at one of the UE, NB, the network device above a serving gateway (SGW)/packet data network gateway (PGW), any layer between the RAN and an application layer, and the application layer.

6. The method of claim 1, wherein the forming of the cluster of IP packets having the predetermined maximum size while the timer is running comprises:
- determining radio bearers (RBs) through which each IP packet of the plurality of IP packets are received;
- detecting at least two IP packets of the plurality of IP packets belonging to the same RB; and
- forming the cluster of IP packets having the at least two IP packets of the plurality of IP packets belonging to the same RB such that the lower layer treats the cluster of IP packets as the single payload.

7. The method of claim 1, wherein the transmitting of the grant, by the network device, to one of the UE or the NB comprises:
- determining at least one fixed size packet from the plurality of IP packets, wherein the fixed size packet is configured as per a FixedPacketSize configuration;
- forming a radio link control (RLC) protocol data unit (PDU) based on the fixed size packet; and
- forming a medium access control (MAC) transport block (TB) by processing the fixed size packet based on the FixedPacketSize configuration to transmit the grant to one of the UE or the NB.

8. The method of claim 7, wherein the grant is processed in terms of number of packets based on the FixedPacketSize configuration.

9. The method of claim 6, wherein one of the UE and the NB receives the grant from the network device and optimizes maximum segment size at a transmission control protocol (TCP) layer to transmit the plurality of IP packets to the network device.

10. A method for clustering Internet protocol (IP) packets by a user equipment (UE) in a wireless network, the method comprising:
- receiving a plurality of IP packets from an upper layer of one of a network device and a radio access network (RAN) base station (NB) in the wireless network, in response to transmitting a grant by the UE to one of the network device and the NB;
- initiating a timer on receiving the plurality of IP packets from the upper layer;
- forming a cluster of IP packets having a predetermined maximum size while the timer is running;
- stopping the timer once a formation of the cluster is completed; and
- transmitting the cluster of IP packets to a lower layer of one of the network device and the NB, wherein the lower layer treats the cluster of IP packets as a single payload.

11. The method of claim 10, wherein the initiating of the timer on receiving the plurality of IP packets from the upper layer comprises:
- detecting the plurality of IP packets received by the upper layer of one of the network device or the NB;
- forming a packet blender layer in one of the network device or the NB based on a plurality of parameters, wherein the packet blender layer receives the plurality of IP packets from the upper layer;
- accumulating the plurality of IP packets in the packet blender layer; and
- starting the timer to form the cluster of IP packets in the packet blender layer by setting a ClusterSize and a ClusterCount.

12. A network device for clustering Internet protocol (IP) packets in a wireless network, the network device comprising:
- a memory;
- a communicator; and
- at least one processor coupled to the memory and the communicator, wherein the at least one processor is configured to:
  - receive a plurality of IP packets from an upper layer of one of a user equipment (UE) and a radio access network (RAN) base station (NB) in the wireless network, in response to transmitting a grant by the network device to one of the UE and the NB,
  - initiate a timer on receiving the plurality of IP packets from the upper layer,
  - form a cluster of IP packets having a predetermined maximum size while the timer is running,
  - stop the timer once a formation of the cluster is completed, and
  - transmit the cluster of IP packets to a lower layer of one of the UE and the NB, wherein the lower layer treats the cluster of IP packets as a single payload.

13. The network device of claim 12, wherein to initiate the timer on receiving the plurality of IP packets from the upper layer, the at least one processor is configured to:
- detect the plurality of IP packets received by the upper layer of one of the UE and the NB;
- form a packet blender layer in one of the UE and the NB based on a plurality of parameters, wherein the packet blender layer receives the plurality of IP packets from the upper layer;
- accumulate the plurality of IP packets in the packet blender layer; and
- start the timer to form the cluster of IP packets in the packet blender layer by setting a ClusterSize and a ClusterCount.

14. The network device of claim 13,
- wherein the ClusterSize is a maximum accumulated size of the cluster of IP packets, and
- wherein the ClusterCount is a maximum accumulated number of the IP packets formed within the cluster of IP packets.

15. The network device of claim 13, wherein the plurality of parameters comprises at least one of:
- requirement of an application;
- a service level agreement between an application provider and a service provider;
- a pre-configured message exchange between the application provider and the service provider; and
- a pre-defined network slice identifier.

16. The network device of claim 15, wherein the pre-defined network slice identifier decides location of the packet blender layer at one of the UE, NB, the network device above a serving gateway (SGW)/packet data network gateway (PGW), any layer between the RAN and an application layer, and the application layer.

17. The network device of claim 12, wherein to forming the cluster of IP packets having the predetermined maximum size while the timer is running, the at least one processor is configured to:
- determine radio bearers (RBs) through which each IP packet of the plurality of IP packets are received;
- detect at least two IP packets of the plurality of IP packets belonging to the same RB; and
- form the cluster of IP packets having the at least two IP packets of the plurality of IP packets belonging to the same RB such that the lower layer treats the cluster of IP packets as the single payload.

18. The network device of claim 12, wherein to transmit the grant by the network device to one of the UE or the NB, the at least one processor is configured to:

determine at least one fixed size packet from the plurality of IP packets, wherein the fixed size packet is configured as per a FixedPacketSize configuration;

form a radio link control (RLC) protocol data unit (PDU) based on the fixed size packet; and form a medium access control (MAC) transport block (TB) by processing the fixed size packet based on the FixedPacketSize configuration to transmit the grant to one of the UE or the NB.

19. The network device of claim 18, wherein the grant is processed in terms of number of packets based on the FixedPacketSize configuration.

20. The network device of claim 17, wherein one of the UE or the NB receives the grant from the network device and optimizes maximum segment size at a transmission control protocol (TCP) layer to transmit the plurality of IP packets to the network device.

* * * * *